US012235617B2

(12) United States Patent
Piaskowski et al.

(10) Patent No.: US 12,235,617 B2
(45) Date of Patent: Feb. 25, 2025

(54) SITE COMMAND AND CONTROL TOOL WITH DYNAMIC MODEL VIEWER

(71) Applicant: Tyco Fire & Security GmbH, Neuhausen am Rheinfall (CH)

(72) Inventors: Ryan A. Piaskowski, Milwaukee, WI (US); Youngchoon Park, Brookfield, WI (US); Christopher Heidger, West Allis, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 238 days.

(21) Appl. No.: 17/666,344

(22) Filed: Feb. 7, 2022

(65) Prior Publication Data
US 2022/0253027 A1 Aug. 11, 2022

Related U.S. Application Data

(60) Provisional application No. 63/146,851, filed on Feb. 8, 2021.

(51) Int. Cl.
*G05B 17/02* (2006.01)
*G06F 3/048* (2013.01)
(Continued)

(52) U.S. Cl.
CPC ......... *G05B 17/02* (2013.01); *G06F 3/04815* (2013.01); *G06F 3/0484* (2013.01)

(58) Field of Classification Search
CPC ............ G05B 17/02; G05B 2219/2642; G05B 15/02; G06F 3/04815; G06F 3/0484
(Continued)

(56) References Cited

U.S. PATENT DOCUMENTS 5,301,109 A 4/1994 Landauer et al.
5,446,677 A 8/1995 Jensen et al.
(Continued)

FOREIGN PATENT DOCUMENTS

AU 2019226217 A1 11/2020
AU 2019226264 A1 11/2020
(Continued)

OTHER PUBLICATIONS

U.S. Appl. No. 17/566,029, Passivelogic, Inc.
(Continued)

*Primary Examiner* — Michael J Brown
(74) *Attorney, Agent, or Firm* — Foley & Lardner LLP

(57) ABSTRACT

A building system including one or more memory devices having instructions stored thereon, that, when executed by one or more processors, cause the one or more processors to generate a user interface comprising a 2-dimensional (2D) model of a building and a 3-dimensional (3D) model of the building. The instructions further cause the one or more processors to receive a first user input indicating a selection of a first object. The instructions further cause the one or more processors to determine a physical space or equipment represented by the first object and one or more events associated with the physical space or equipment. The instructions further cause the one or more processors to receive a second user input indicating creation of an incident based on the one or more events and to initiate an automated response process in response to the creation of the incident.

20 Claims, 15 Drawing Sheets

(51) Int. Cl.
  *G06F 3/04815* (2022.01)
  *G06F 3/0484* (2022.01)
  *G05B 15/02* (2006.01)

(58) Field of Classification Search
  USPC .................................................. 700/275
  See application file for complete search history.

(56) References Cited

U.S. PATENT DOCUMENTS

| | | | |
|---|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,447,985 B2 | 9/2016 | Johnson |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,031,494 B2 | 7/2018 | Holaso |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,409,243 B2 | 9/2019 | Holaso |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,854,194 B2 | 12/2020 | Park et al. |
| 10,862,928 B1 | 12/2020 | Badawy et al. |
| 10,871,756 B2 | 12/2020 | Johnson et al. |
| 10,908,578 B2 | 2/2021 | Johnson et al. |
| 10,921,760 B2 | 2/2021 | Harvey |
| 10,921,768 B2 | 2/2021 | Johnson et al. |
| 10,921,972 B2 | 2/2021 | Park et al. |
| 10,969,133 B2 | 4/2021 | Harvey |
| 10,976,068 B2 | 4/2021 | Hallendy et al. |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,156,978 B2 | 10/2021 | Johnson et al. |
| 11,229,138 B1 | 1/2022 | Harvey et al. |
| 11,314,726 B2 | 4/2022 | Park et al. |
| 11,314,788 B2 | 4/2022 | Park et al. |
| 11,467,550 B2 | 10/2022 | Holaso |
| 11,556,105 B2 | 1/2023 | Cooley et al. |
| 11,561,522 B2 | 1/2023 | Cooley et al. |
| 11,561,523 B2 | 1/2023 | Cooley et al. |
| 11,573,551 B2 | 2/2023 | Cooley et al. |
| 11,586,167 B2 | 2/2023 | Cooley et al. |
| 11,783,658 B2 | 10/2023 | Chaurasia et al. |
| 11,868,104 B2 | 1/2024 | Holaso |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0012491 A1 | 1/2004 | Kulesz et al. |
| 2004/0068390 A1 | 4/2004 | Saunders |
| 2004/0128314 A1 | 7/2004 | Katibah et al. |

(56) References Cited

U.S. PATENT DOCUMENTS

| | | |
|---|---|---|
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0109473 A1 | 4/2016 | Demarco |
| 2016/0119434 A1 | 4/2016 | Dong et al. |
| 2016/0127712 A1 | 5/2016 | Alfredsson et al. |
| 2016/0132816 A1 | 5/2016 | Lush |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |

(56) References Cited

U.S. PATENT DOCUMENTS

| | | |
|---|---|---|
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0123397 A1 | 5/2017 | Billi et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gartner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0027255 A1 | 1/2019 | D'Amelia |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0097909 A1 | 3/2019 | Puri et al. |
| 2019/0102840 A1 | 4/2019 | Perl et al. |
| 2019/0121801 A1 | 4/2019 | Jethwa et al. |
| 2019/0130718 A1 | 5/2019 | Alpert |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2019/0324986 A1 | 10/2019 | Schwartz et al. |
| 2019/0325368 A1 | 10/2019 | Turney et al. |
| 2019/0355177 A1* | 11/2019 | Manickam ......... G02B 27/0172 |
| 2019/0377306 A1 | 12/2019 | Harvey |
| 2020/0065151 A1* | 2/2020 | Ghosh .................. G06F 40/295 |
| 2020/0226156 A1 | 7/2020 | Borra et al. |
| 2020/0265375 A1 | 8/2020 | Azad |
| 2020/0285203 A1 | 9/2020 | Thakur et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2021/0383611 A1* | 12/2021 | Kanski ................ G06F 3/04847 |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0215264 A1 | 7/2022 | Harvey et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |

FOREIGN PATENT DOCUMENTS

| | | |
|---|---|---|
| CA | 2957726 A1 | 3/2016 |
| CA | 3043996 A1 | 2/2018 |
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 186 687 A4 | 7/2017 |

(56) References Cited

FOREIGN PATENT DOCUMENTS

| | | |
|---|---|---|
| EP | 3 268 821 B1 | 1/2018 |
| EP | 3 324 306 A1 | 5/2018 |
| EP | 3 497 377 A1 | 6/2019 |
| EP | 4 226 263 A1 | 8/2023 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2020/061621 A1 | 4/2020 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

U.S. Appl. No. 17/567,275, Passivelogic, Inc.
U.S. Appl. No. 17/722,115, Passivelogic, Inc.
Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema for Buildings." BuildSys '16, Palo Alto, CA, USA, Nov. 16-17, 2016 (10 pages).
Bhattacharya et al., "Short Paper: Analyzing Metadata Schemas for Buildings—The Good, the Bad and the Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema for Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).

Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 1, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-loT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works,"

(56) References Cited

OTHER PUBLICATIONS

URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, a physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work for Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "Sparql: Query Language for RDF," located on the Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
Zhou, Q. et al., "Knowledge-infused and Consistent Complex Event Processing over Real-time and Persistent Streams," Further Generation Computer Systems, 2017, 76 (pp. 391-406).
Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-

(56) References Cited

OTHER PUBLICATIONS

Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation Gui," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

White et al., "Reduce building maintenance costs with AWS IoT TwinMaker Knowledge Graph," the Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).

\* cited by examiner

SITE COMMAND AND CONTROL TOOL WITH DYNAMIC MODEL VIEWER

CROSS-REFERENCE TO RELATED PATENT APPLICATIONS

This application claims the benefit of and priority to U.S. Provisional Patent Application No. 63/146,851, filed Feb. 8, 2021, the entirety of which is incorporated by reference herein.

BACKGROUND

The present disclosure relates generally to a command and control tool for a site or a building. More specifically, according to some illustrative embodiments, the present disclosure relates to a command and control tool that can dynamically generate and present user interfaces to provide a wide variety of information.

A site (e.g., a building, a campus, a stadium, etc.) may include a large number of subsystems, spaces, and/or equipment that can be centrally managed by a command and control system. The command and control system can aggregate data from any number of points (e.g., devices, spaces, etc.) and can present the data in one or more user interfaces. Some site management systems (e.g., a building management system (BMS)) can also include a model viewer for interacting with 2-dimensional (2D) or 3-dimensional (3D) models of the site.

SUMMARY

One implementation of the present disclosure is a building system including one or more memory devices having instructions stored thereon that, when executed by one or more processors, cause the one or more processors to generate a user interface comprising a 2-dimensional (2D) model of a building and a 3-dimensional (3D) model of the building. The instructions further cause the one or more processors to receive a first user input indicating a selection of a first object in the 2D model or the 3D model. The instructions further cause the one or more processors to determine a physical space or equipment represented by the first object. The instructions further cause the one or more processors to determine one or more events associated with the physical space or equipment. The instructions further cause the one or more processors to receive a second user input indicating creation of an incident based on the one or more events. The instructions further cause the one or more processors to initiate an automated response process in response to the creation of the incident.

Another implementation of the present disclosure is a method including generating a user interface comprising a 2-dimensional (2D) model of a building and a 3-dimensional (3D) model of the building. The method further includes receiving a first user input indicating a selection of a first object in the 2D model or the 3D model. The method further includes determining a physical space or equipment represented by the first object. The method further includes determining one or more events associated with the physical space or equipment. The method further includes receiving a second user input indicating creation of an incident based on the one or more events. The method further includes initiating an automated response process in response to the creation of the incident.

Another implementation of the present disclosure is a building system including one or more memory devices having instructions stored thereon that, when executed by one or more processors, cause the one or more processors to generate a user interface comprising a 2-dimensional (2D) model of a building and a 3-dimensional (3D) model of the building. The instructions further cause the one or more processors to receive a first user input indicating a selection of a first object in the 2D model or the 3D model. The instructions further cause the one or more processors to determine a physical space or equipment represented by the first object. The instructions further cause the one or more processors to determine one or more events associated with the physical space or equipment. The instructions further cause the one or more processors to receive a second user input associated with adjusting a view of one of the 2D model or the 3D model. The instructions further cause the one or more processors to automatically update a view of the other of the 2D model or the 3D model based on the second user input.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the FIGURES, a site command and control tool is shown, according to some embodiments. The site command and control tool may be configured to generate a command and control dashboard (i.e., user interface) that presents a wide variety of operating data and event data relating to equipment and spaces of a site, within a single interface. For example, a command and control dashboard could present aggregate energy usage data, operating statuses, occupancy levels, alarm or event information, security data, etc., for an entire site in a single, intuitive interface. In this regard, a command and control dashboard can provide a "one-stop shop" for users to monitor, command, and/or control the various systems, equipment, and spaces of a site.

In some embodiments, the site command and control tool can generate a dynamic user interface that includes one or more model viewers for presenting 2-dimensional (2D) and/or 3-dimensional (3D) models of a site or building. In one example, a user interface includes both a 2D and a 3D model viewer for presenting two models simultaneously. In this manner, a user can view a great deal more information than a single 2D or 3D site model would provide. For example, the user can determine where an object shown in the 3D model is located in a floorplan (e.g., a 2D model) of a building. In some embodiments, a user may also be able to generate incidents within the 2D or 3D model viewers, such as by selecting an object within a model. This may reduce the amount of user interaction required to identify or select a particular space or equipment when creating an incident, and may provide a more intuitive incident response. Additional features and advantages of the present disclosure are described in greater detail below.

Building with Building Systems

Figure 1:
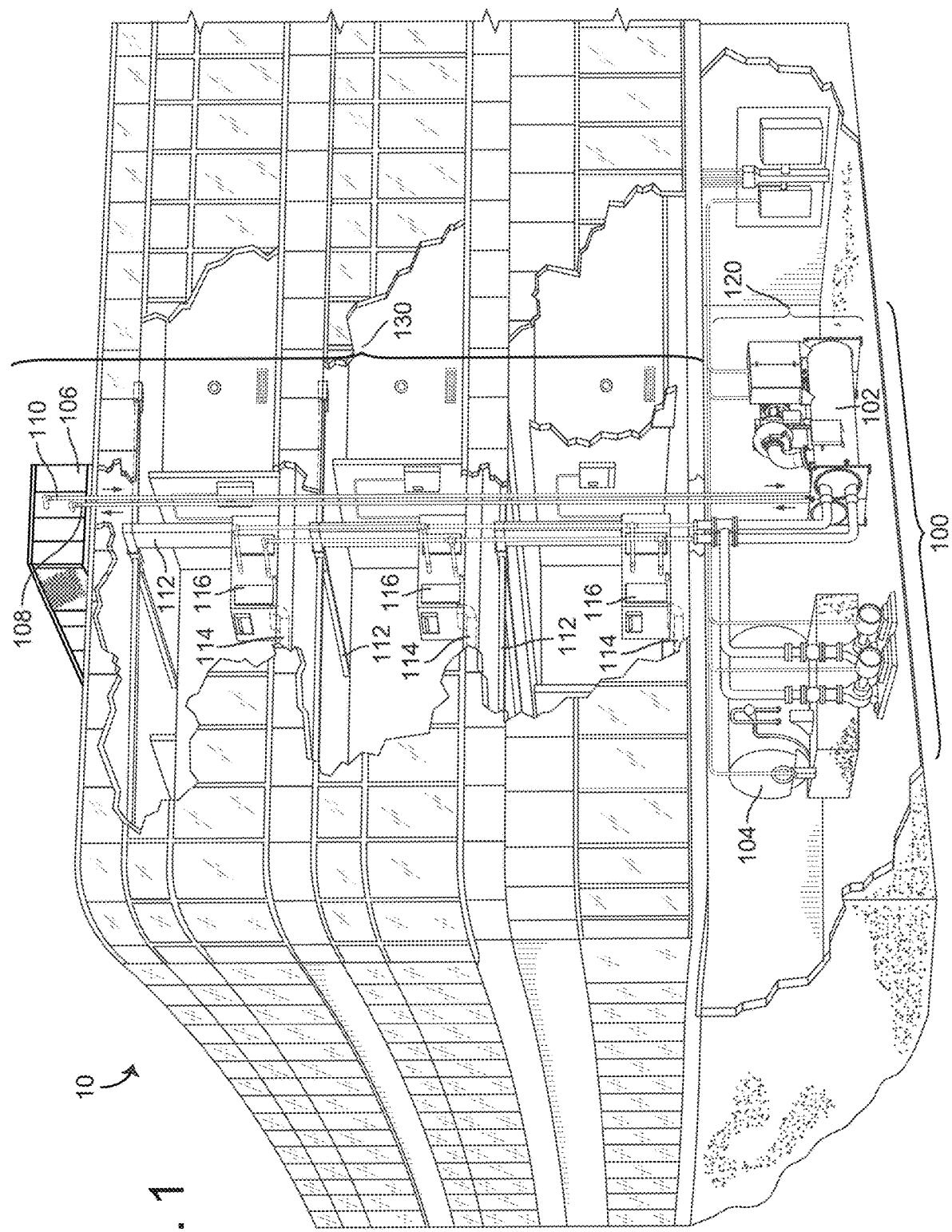
FIG. 1 is a drawing of a building equipped with a HVAC system, according to some embodiments.

Referring now to FIGS. 1-4, an exemplary building management system (BMS) and HVAC system in which the systems and methods of the present disclosure can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire safety system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
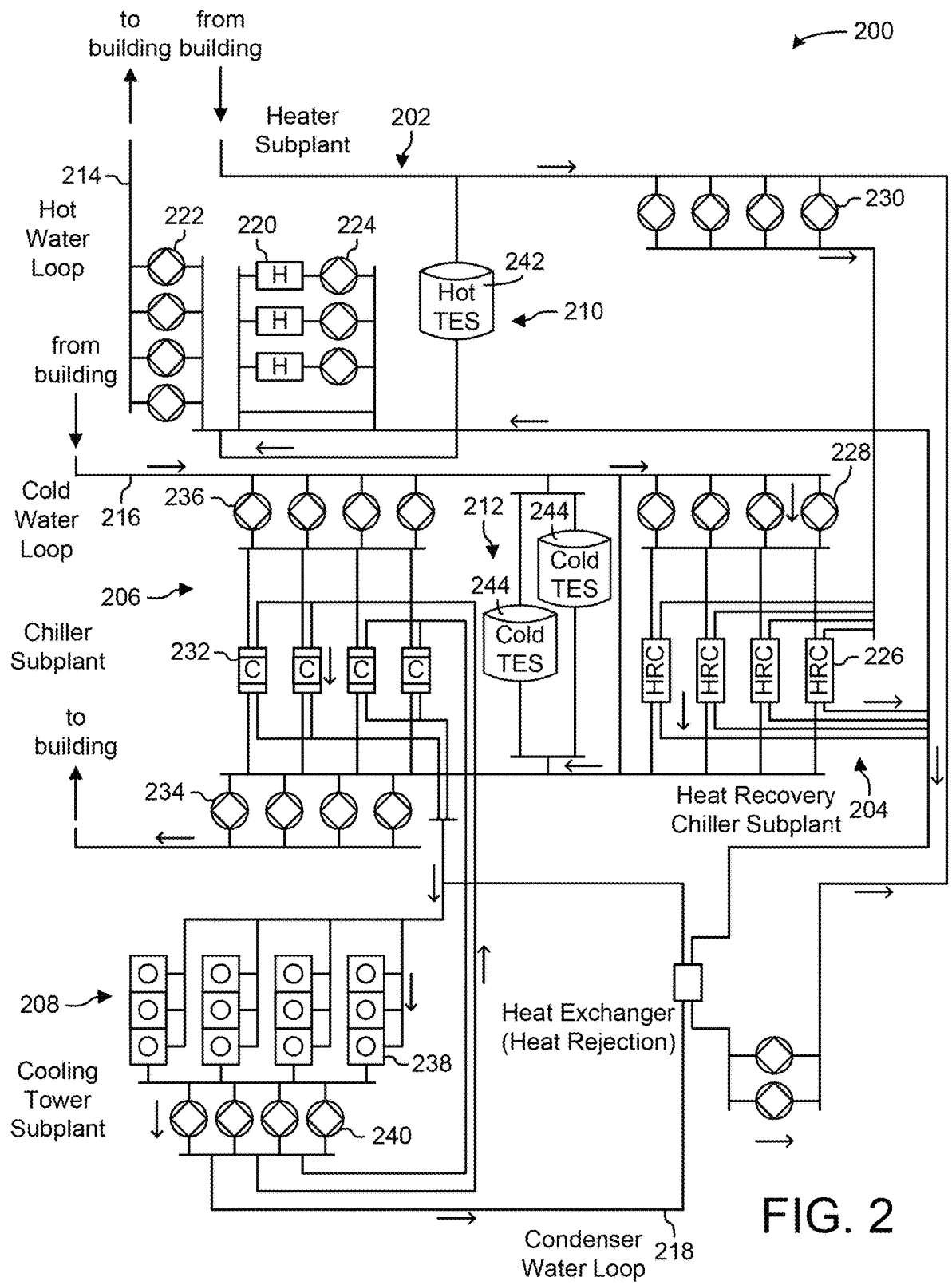
FIG. 2 is a block diagram of a waterside system that may be used in conjunction with the building of FIG. 1, according to some embodiments.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
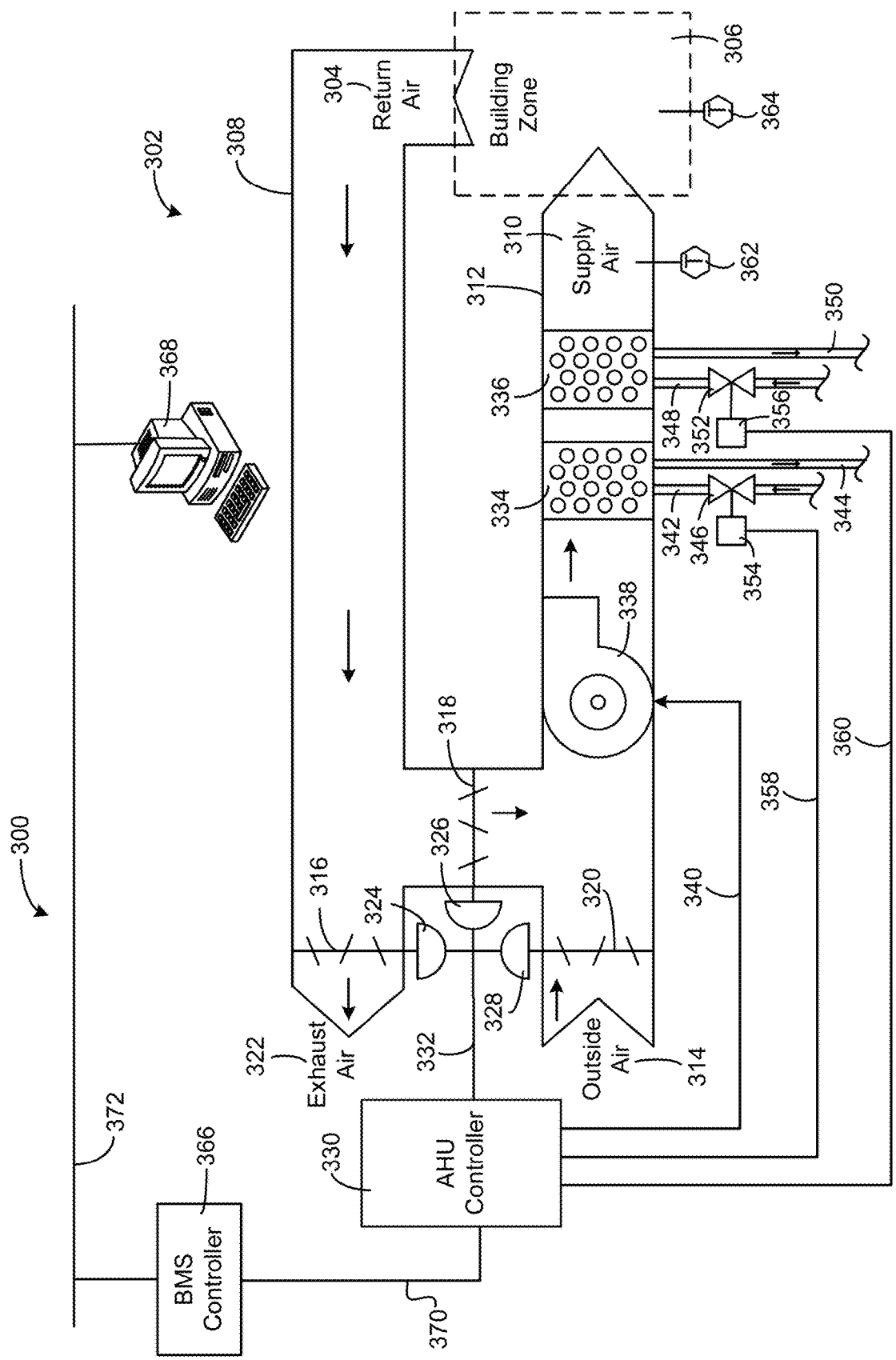
FIG. 3 is a block diagram of an airside system that may be used in conjunction with the building of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building automation system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
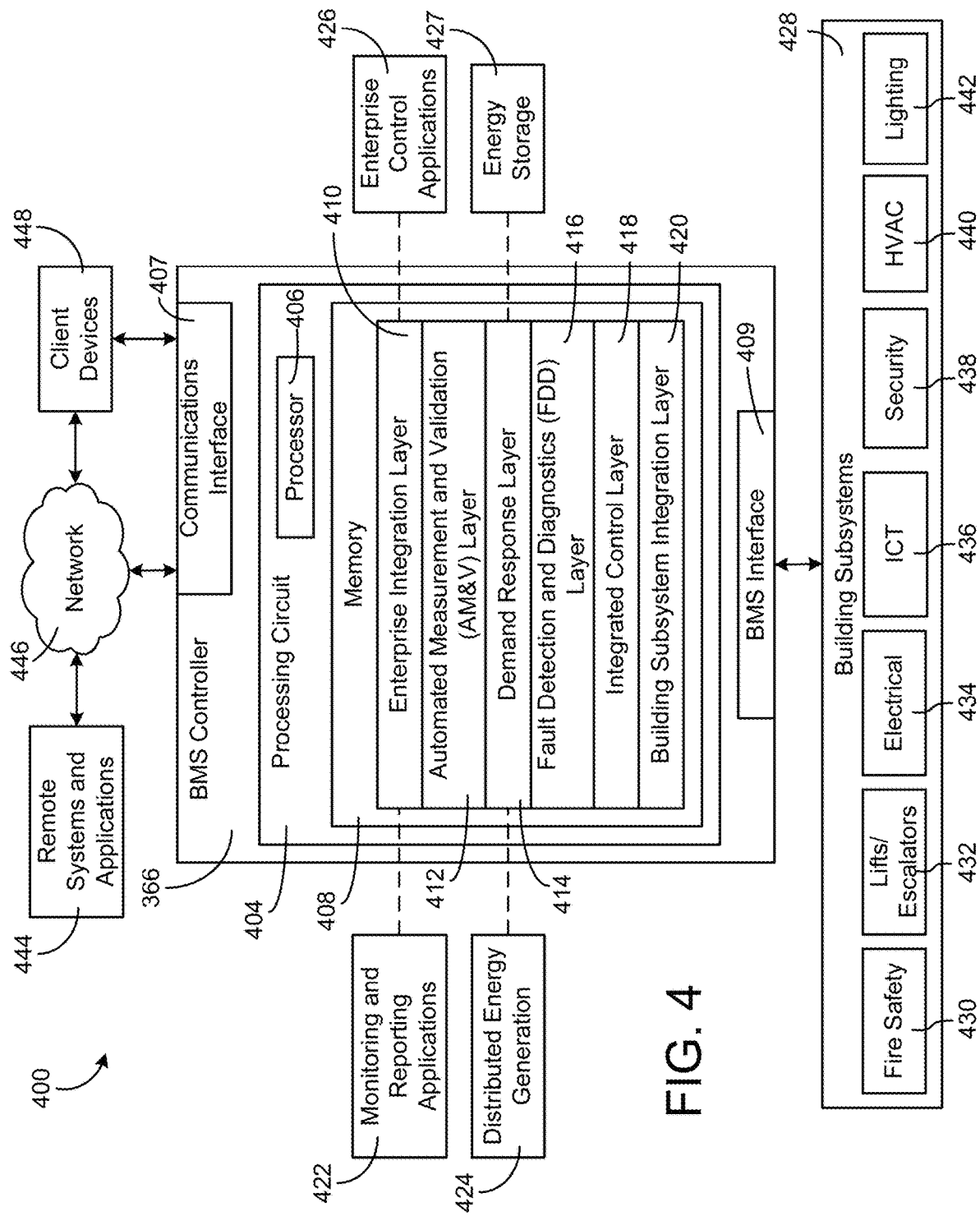
FIG. 4 is a block diagram of a building management system (BMS) that may be used to monitor and/or control the building of FIG. 1, according to some embodiments.

Referring now to FIG. 4, a block diagram of a building automation system (BMS) 400 is shown, according to some embodiments. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated super-system. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Site Command and Control Tool

Figure 5A:
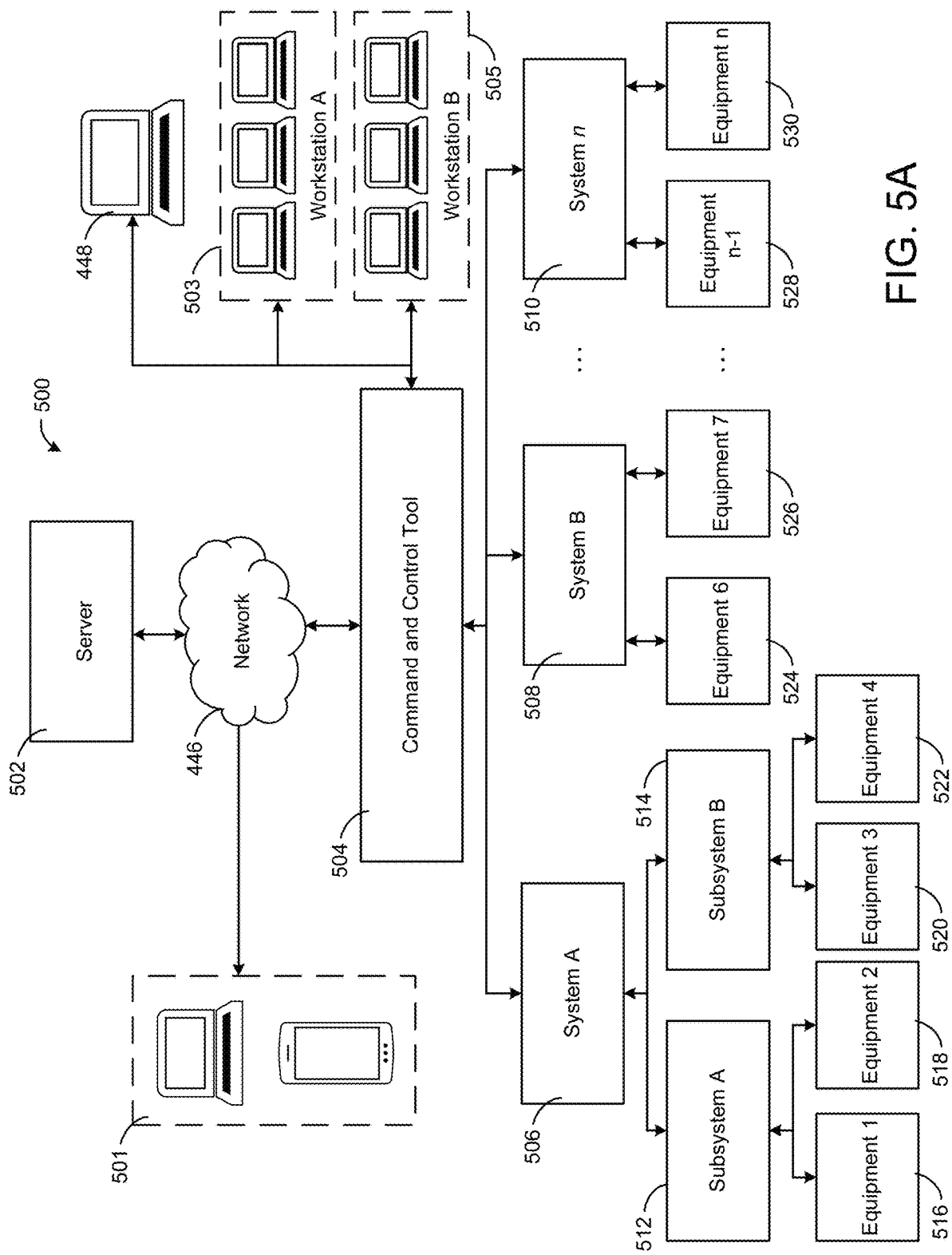
FIG. 5A is a block diagram of a system for command and control of a site or building, according to some embodiments.

Referring now to FIG. 5A, a block diagram of a command and control system 500 for a site or building is shown, according to some embodiments. System 500 may provide a high-level overview of the operations of various building or site equipment, and may allow a user to manage a variety of subsystems and equipment from a single device or interface. In some embodiments, described in detail below, system 500 provides intuitive and user-friendly interfaces that allow a user to monitor, command, and/or control these subsystems and equipment. It will be appreciated that, as discussed herein, system 500 may be implemented in in sort of location or structure that includes one or more devices or subsystems. For example, system 500 can be implemented for a sports arena, a hospital, a campus, etc. Accordingly, while "site" and "building" are used herein, these terms are not intended to be limiting.

In some embodiments, system 500 also allows a user to quickly and efficiently respond to events or incidents that may affect site equipment and spaces. In other words, a user (e.g., a building manager) may be able to monitor events corresponding to the various subsystems, equipment, and spaces of site, and may respond to the events from a single interface. In the case of a fire alarm, for example, the user could determine what device (e.g., an alarm panel, a sensor, etc.) is experiencing the fire alarm event (e.g., has detected a fire), and may initiate a response procedure to deal with the fire alarm.

System 500 is shown to include a server 502 communicably coupled to network 446. While shown as a single component (e.g., a remote server or computing device), server 502 may also be implemented across multiple servers (e.g., via a distributed computing architecture). Server 502 generally includes a processor and memory for storing and executing instructions. Similar to BMS controller 366, the memory of server 502 may include one or more devices (e.g., RAM, ROM, Flash memory, hard disk storage, etc.) for storing data and/or computer code for completing or facilitating the various processes, layers and modules described in the present application. The memory may be or include volatile memory or non-volatile memory and may include database components, object code components, script components, or any other type of information structure for supporting the various activities and information structures described in the present application.

System 500 is also shown to include one or more user devices 501 that are communicably coupled to network 446. For example, user devices 501 may be connected to network 446 via an intranet or via the Internet, either via a wired connection or a wireless connection. Examples of user devices 501 include, but are not limited to, mobile phones, electronic tablets, laptops, desktop computers, workstations, and other types of electronic devices. More generally, user devices 501 may include any electronic device that allows a user to interact with system 500 (e.g., through a user interface). Accordingly, each of user devices 501 can include an input device (e.g., a keyboard) and an output device (e.g., a screen).

System 500 is further shown to include a command and control tool 504. Command and control tool 504 may aggregate data from multiple subsystems, devices, and/or spaces of a site, may generate dynamic and intuitive user interfaces for monitor and/or controlling said subsystems, devices, and/or spaces, and may initiate automated response processes based on detected incidents. As described in detail below, in some embodiments, command and control tool 504 may include and/or integrate with one or more additional platforms or services such as a workflow automation platform, a collaboration platform, and an active directory. Advantageously, command and control tool 504 allows for easy integration of third party services and components to increase functionality.

In some embodiments, command and control tool 504 is implemented via a dedicated computer or computing device that includes a processor and memory. For example, command and control tool 504 may be implemented via a user device such as user device 448. In some embodiments, command and control tool 504 is implemented at least partially via BMS controller 366 (e.g., within memory 408) or server 502. For example, command and control tool 504 may be implemented by a separate or dedicated computer, or may be implemented at least partially by server 502. In some embodiments, the functionality of command and control tool 504 is implemented jointly by BMS controller 366 and server 502, via network 446.

In some embodiments, command and control tool 504 may be implemented on one or more workstations, such as workstation 503 or 505. Workstations 503 and 505 can include one or more computing devices (e.g., including processors and memory), and in some cases can include multiple user interface (e.g., monitors). For example, workstation 503 may be a central command workstation that includes at least three monitors for viewing large amounts of information. In some embodiments, workstation 503 and 505 represent groups of workstations (e.g., groups of individual computing devices) organized together based on one or more parameters. For example, a group of computing devices or user interfaces may be organized into a group based on a role or a location of the user's operating said devices.

In some embodiments, command and control tool 504 is implemented in a server, multiple servers (e.g. via a distributed computing architecture), a cloud computing platform, a controller, via microservices located across multiple computing devices, and/or on (or distributed across) any other computing device or system. In some embodiments, command and control tool 504 is implemented via a processing circuit (e.g., a memory and/or a processor) and/or implemented across multiple processing circuits (e.g., multiple memories and/or processors).

As shown, command and control tool 504 may be communicably coupled to any number of building systems 506-510. Systems 506-510 may include any of the building systems and subsystems previously described with respect to FIG. 4, for example, including building electrical subsystem 434, ICT subsystem 436, security subsystem 438, HVAC subsystem 440, lighting subsystem 442, lift/escalators subsystem 432, fire safety subsystem 430, or any other system/subsystem associated with a building or site monitored by command and control tool 504. In some embodiments, command and control tool 504 is communicably coupled to systems 506-510 through BMS controller 366.

In some embodiments, systems 506-510 may be coupled to one or more subsystems, such as subsystems 512 and 514 (e.g., "Subsystem A" and "Subsystem B," respectively). Subsystems 512 and 514 may be any system controlled and/or monitored by one of the higher-level systems 506-510. For example, subsystems 512 and 514 may also include any of building electrical subsystem 434, ICT subsystem 436, security subsystem 438, HVAC subsystem 440, lighting subsystem 442, lift/escalators subsystem 432, fire safety subsystem 430, or may include smaller subsets of building equipment. Each of systems 506-510 and/or subsystems 512 and 514 is connected to a plurality of equipment, shown as equipment 516-530. For example, if subsystem 512 is an HVAC subsystem including an HVAC controller or other central controller, then each of equipment 516 and equipment 518 may include any type of HVAC device (e.g., a VAV, an AHU, etc.).

In some embodiments, each of systems 506-510 and/or subsystems 512 and 514 may include a controller or other computing device that aggregates data received from corresponding equipment 516-530. During operation of system 500 (e.g., while any of equipment 516-530 are operating or active), each of systems 506-510 and/or subsystems 512 and 514 may receive and aggregate data from any corresponding equipment regarding the operation of the equipment. Likewise, higher-level systems (e.g., system 506) may be configured to receive and aggregate data from subsystems 512 and 514. For example, if system 508 is a fire alarm subsystem, then equipment 524 and 526 may be fire alarm, sensors, or alarm panels that transmit data such as current values, alarms, live video/audio, etc., to a central controller. In particular, each of systems 506-510 may receive and aggregate alarm or event data and/or operational data (e.g., sensor readings) from equipment 516-530.

As described herein, an event may be any noteworthy indication received from any of equipment 516-530. As an example, an event may be an indication that a condition (i.e., a sensor value, energy usage, etc.) is outside of a normal range. An event could range from an indication of an equipment failure, for example, to a security breach within a stadium or building. In other examples, an event may indicate that a security camera is disconnected or that an area of a building is overcrowded. In some embodiments, an event may simply indicate that one of equipment 516-530 changed any operating mode or a state. Those of skill in the art will appreciate that an event may include any number of conditions, and that the examples described herein are for exemplary purposes and are not intended to be limiting.

Command and control tool 504 may receive the aggregate alarm/event data and/or other operational data from each of systems 506-510, and may further aggregate the received data for the entire system. In this regard, command and control tool 504 can utilize the aggregate data to generate an overview (e.g., a user interface) of all alarms and events for the entire system (e.g., for all of equipment 516-530), and, more generally, an overview of system operations. Accordingly, a user (e.g., of user device 448 or user device(s) 501) may access command and control tool 504 in order to view alarm/event and operating data for an entire site or building from a single interface.

In addition to aggregating alarm and event data for each subsystem, command and control tool 504 may enrich the received data by retrieving additional information, such as from server 502 and/or another database. The additional information may include, for example, an indication of where equipment is located within a building or site, equipment/subsystem relationships, etc. In some embodiments, command and control tool 504 may even retrieve building information model (BIM) files or other 2D or 3D model data corresponding to the equipment. In some embodiments, a user of user device 448 or user device(s) 501 may view the additional data for an alarm or an event to determine where the event is occurring and what equipment it is affecting, and may even view 3D models of the affected equipment, as described in detail below.

Figure 5B:
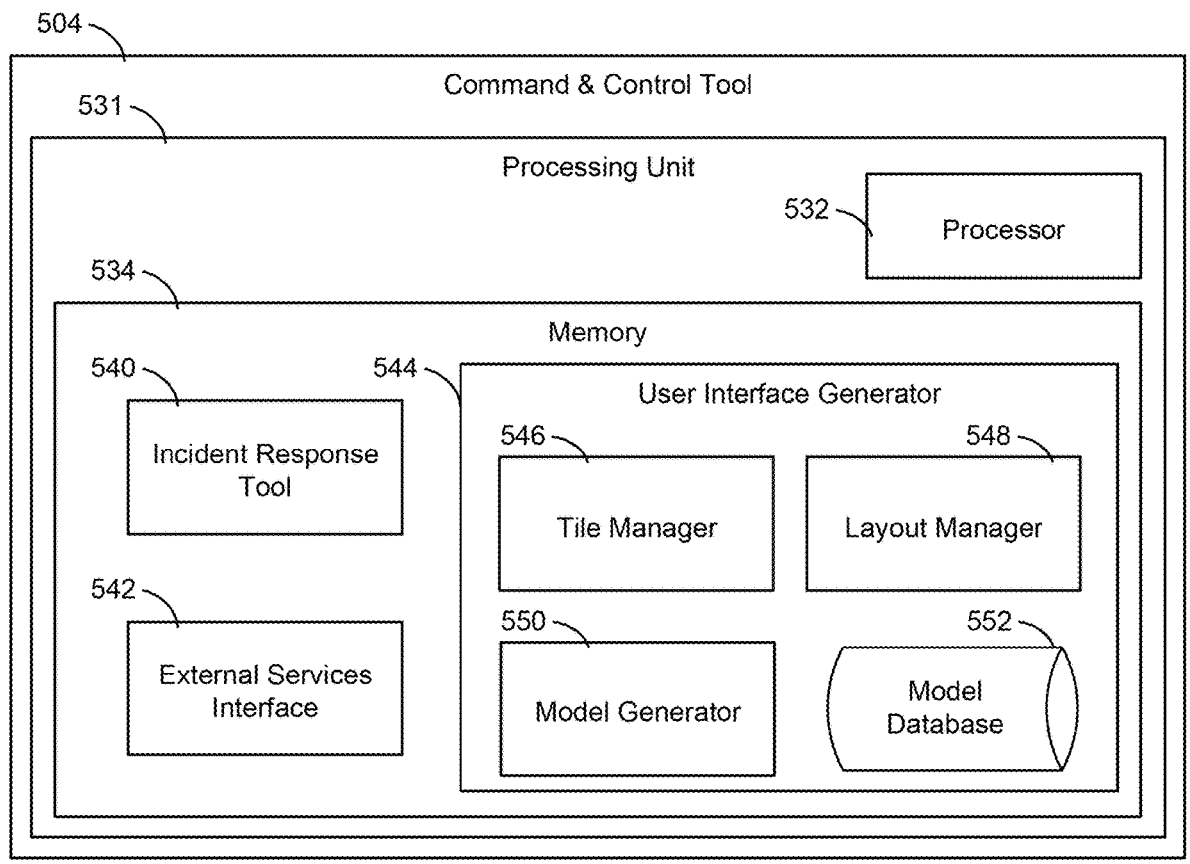
FIG. 5B is a block diagram of a command and control tool implemented in the system of FIG. 5A, according to some embodiments.

Referring now to FIG. 5B, a more detailed block diagram of command and control tool 504 is shown, according to some embodiments. As briefly described above, command and control tool 504 may generally obtain and aggregate operational data from a plurality of site systems, subsystems, and/or equipment (e.g., systems 506-510, subsystems 512 and 514, and/or equipment 516-530). Command and control tool 504 may allow a user to quickly and easily respond to events by creating incidents and initiating automated response procedures. Command and control tool 504 may also generate dynamic user interfaces to aid in site management. In some embodiments, command and control tool 504 generates user interfaces that include 2D and/or 3D model viewers to provide additional context/information to a user, as described in greater detail below.

Command and control tool 504 is shown to include a processing circuit 531 that includes a processor 532 and a memory 534. It will be appreciated that these components can be implemented using a variety of different types and quantities of processors and memory. For example, processor 532 can be a general purpose processor, an application specific integrated circuit (ASIC), one or more field programmable gate arrays (FPGAs), a group of processing components, or other suitable electronic processing components. Processor 532 can be communicatively coupled to memory 534. While processing circuit 531 is shown as including one processor 532 and one memory 534, it should be understood that, as discussed herein, a processing circuit and/or memory may be implemented using multiple processors and/or memories in various embodiments. All such implementations are contemplated within the scope of the present disclosure.

Memory 534 can include one or more devices (e.g., memory units, memory devices, storage devices, etc.) for storing data and/or computer code for completing and/or facilitating the various processes described in the present disclosure. Memory 534 can include random access memory (RAM), read-only memory (ROM), hard drive storage, temporary storage, non-volatile memory, flash memory, optical memory, or any other suitable memory for storing software objects and/or computer instructions. Memory 534 can include database components, object code components, script components, or any other type of information structure for supporting the various activities and information structures described in the present disclosure. Memory 534 can be communicably connected to processor 532 via processing circuit 531 and can include computer code for executing (e.g., by processor 532) one or more processes described herein.

Memory 534 is shown to include an incident response tool 540. Incident response tool 540 may receive the aggregate alarm and event data from each of systems 506-510 and further aggregate the alarm and event data for the entire system. In this regard, incident response tool 540 may generate an overview of all alarms and events for the entire system (e.g., for all of equipment 516-530). A user may access then view the aggregate alarm and event data, and may choose to create an incident based on a detected event. In some embodiments, incident response tool 540 may automatically generate an incident based on an event.

In response to a detected event (e.g., a fire alarm or an indication that a device is not functioning properly) incident response tool 540 may automatically or semi-automatically initiate response procedures. For example, a user that is monitoring system 500 (e.g., via user device 448) may be alerted to a fire alarm affecting a particular space or equipment, and may analyze the fire alarm to gather additional information and/or validate the alarm. In this example, the user may view a model of the equipment that reported the fire alarm event (e.g., an alarm control panel) and may determine additional information such as where the equipment is located within a building. The user may validate the fire alarm, such as by viewing security camera data from a space (e.g., a hallway) near the location of the equipment or by corresponding with another user (e.g., a technician that travels to the location of the event).

Once the event is verified, the user may create an incident to initiate a response to the event. In one example, the user may select an icon or button within a user interface to create the incident. In response to the user selection, an API call may be generated to create the incident. For example, selecting a "Create Incident" icon or button may cause an API call to a workflow and decision automation platform. In this example, the workflow and decision automation platform may handle at least a portion of the automated response process. In various embodiments, the workflow and decision automation platform may be included in incident response tool 540 or may called by incident response tool 540 to handle at least a portion of the creation of an incident.

Subsequently, incident response tool 540 may generate an incident and initiate automated or semi-automated response procedures. The response procedures may follow a standard operating procedure designed by a building or site manager, or by another user or group. For example, the response procedures may follow a predetermined process based on the event type and severity. In order to initiate the response procedures, command and control tool 504 may first retrieve a process corresponding to the event from server 502 and/or another database. The retrieved data may include a list of task to be performed, a list of users designated to complete the tasks, contact information for the users, and other applicable information.

As part of generating the incident, incident response tool 540 may additionally generate a meeting invitation through a communication and collaboration platform, such as a platform via which multiple users are able to meet via audio and/or video devices, share documents or other media, communicate with one another via text and/or voice, etc. Those of skill in the art will appreciate that any platform may be used that allows incident response tool 540 to generate a meeting and/or a chat room in response to an event.

To generate the meeting, incident response tool 540 may automatically create a meeting or a calendar invite, and populate the meeting or invite with information corresponding to the event. For example, the meeting may include an indication of the type of event, a location associated with the event (e.g., a location of the equipment), an indication of the particular asset or equipment that reported the event, and any other applicable information. Incident response tool 540 may transmit or send the meeting/calendar invite to a set of users associated with the particular event type. In some embodiments, incident response tool 540 may call an API associated with the communication and collaboration platform to generate the meeting.

In some embodiments, the set of users may be predetermined, such as by a building manager, and may include contact information for one or more users (e.g., technicians, security guards, etc.) that have been designated as a member of a team or group for responding to a particular event. In some embodiments, the set of users may be grouped as a team based on an active directory maintained by the building management or company. For example, a team for responding to fire alarms may be created based on a customer active directory. The generated teams may include user segmented by type (e.g., security, facility, etc.) or by space (e.g., stadium, building, etc.). In some embodiments, a new team or channel may be created corresponding to each event. In some embodiments, if the team or channel to be created corresponds to the same team as a previously created team/channel, the incident information may be added to the previous team/channel, such that the team members can view the new incident information in relation to information about prior incidents, which may be helpful in addressing the present incident.

As an example for an event associated with an HVAC subsystem, such as a chiller that indicates an alarm because it is not functioning properly, incident response tool 540 may generate a meeting request that indicates at least the type of event (e.g., "Chiller Malfunction"), a location of the effected chiller, and other information about the chiller or the event, and may transmit the meeting request to a set of users associated with the HVAC subsystem. For example, the meeting invite may be sent to one or more maintenance technicians and a building manager, so that the building manager may coordinate with the technicians to fix the chiller. As described above, the set of users that receive the meeting invite may be automatically determined based on the event type or affected equipment.

In some embodiments, the meeting request may include a link to a video, audio, and/or chat interface. For example, a link may be included within the meeting invite or post that a user may select to join a virtual meeting. Accordingly, the set of users that receive the meeting invite may join the virtual meeting and share video, audio, or text data to resolve the event. In some embodiments, the users may share video of the equipment or space associated with the event in order to troubleshoot or resolve the event. Additionally, the meeting may be automatically or manually recorded. In some embodiments, the meeting may be generated in real-time or near real-time, such that the relevant users are invited to join the meeting upon receiving the invitation. In some embodiments, the meeting may be generated for a future timeframe. In one such embodiments, the future timeframe may be determined based on factors such as, but not limited to, the availability of the users (e.g., according to shared schedules/calendars of the users), the type of the incident, the urgency of the incident, etc.

Still referring to FIG. 5B, memory 534 is also shown to include an external services interface 542. Command and control tool 504 may obtain data from a variety of external (i.e., remote) and/or third-party services via external services interface 542. External services interface 542 may obtain data from remote systems and applications 444, for example. These external and/or third-party services can provide any sort of information that may be useful in the command and control of a site or building. In some embodiments, external services interface 542 receives weather data from an external weather service. In some embodiments, external services interface 542 receives data from an external event and risk detection service, such as Dataminr®. In such embodiments, external services interface 542 may receive social media data, such as live feeds or posts. Using a football stadium as an example, external services interface 542 may receive a feed of social media posts that relate to a football game, mention a location at or near the stadium, use a particular hashtag or keyword, etc. Though not discussed here in the interest of brevity, will be appreciated that external services interface 542 can receive any other sort of external or third-party data in addition to weather and social media data.

Memory 534 also includes a user interface generator 544, configured to dynamically generate, modify, and/or update graphical user interfaces that present a variety of site data, such as alarm/event data, equipment operating data, space data, etc. In other words, user interface generator 544 generates a customizable and dynamically modifiable command and control "dashboard" (i.e., user interface), that provides an overview of the various subsystems, equipment, and spaces within a site or building. As mentioned above, a command and control dashboard may be dynamically modifiable based on a number of parameters (e.g., a user's role or preferences, a site status, event detection, etc.). In this regard, user interface generator 544 can provide user-friendly and easy-to-navigate interfaces that provide the most relevant information to a user at any given time.

An interface or dashboard generated by user interface generator 544 may advantageously provide a large amount of data relating to site operations and/or events without necessarily requiring system 500 to handle all the data. In other words, a plurality of external or internal computing systems (e.g., servers) can handle data collection, manipulation, and aggregation, and system 500 may generate a tile-based interface through which the information from other separate applications may be displayed. In this regard, utilizing tiles that display separate application data as described herein leads to a more lightweight, less processing-intensive software, as it does not require the software to ingest and normalize all of the information from disparate sources, and allows for the easy integration of third-party components (e.g., applications). That said, in various implementations, system 500 could also integrate the information from other sources, and one or more of the displayed tiles may display information ingested into and/or otherwise processed by the software generating the tile-based graphical interface.

User interface generator 544 includes a tile manager 546 and a layout manager 548. Tile manager 546 may be configured to generate, identify, and/or obtain (e.g., from a database or a library) a plurality of "tiles" to be presented in a user interface. The "tiles" may be graphical elements (e.g., local or external (e.g., web-based) applications, widgets, etc.), that present information to a user. The tiles may be even be separate user interfaces embedded within a command and control dashboard. For example, a tile may be an embedded application that presents weather information or social media information to a user (e.g., obtained by external services interface 542). As another example, a tile may present operating data for one or more building devices or spaces, such as current equipment operating parameters, energy usage, etc. It will be appreciated that any number and type of tiles may be generated or otherwise obtained by tile manager 546 for display any sort of information. Accordingly, the example tiles described herein are not intended to be limiting. Example tiles generated by tile manager 546 are described in detail with respect to FIGS. 6A-6C.

Layout manager 548 may be configured to generate or determine a layout for the various tiles based on any number of parameters. For example, layout manager 548 may generate or identify a layout based on a user's role or a user's preferences, the status of a site, a detected event or alarm, etc. Accordingly, layout manager 548 may dynamically generate or modify a layout as parameters of a site or building change. For example, layout manager 548 may generate a first layout when a first user logs in (e.g., to system 500), and may generate a second, different layout when a second user log in. As another example, layout manager 548 may adjust the layout of tiles within the interface when a site's status changes. Each tile may represent a portion of a graphical user interface and may be dynamically adjusted to fit within a layout. For example, the size, shape, and/or information presented within a tile may be adjusted to correspond to a layout. Various example tiles and layouts are described in greater detail below.

User interface generator 544 is also shown to include a model generator 550, configured to generate 2D and/or 3D models of a site and to present the 2D or 3D models via a user interface. In some embodiments, model generator 550 is configured to generate 2D and/or 3D site models from one or more building information models (BIMs), although it will be appreciated that site models can be generated from any sort of data file. A BIM can represent physical and/or functional characteristics of a building. For example, a BIM may represent structural characteristics of the building such as walls, floors, ceilings, doors, windows, etc., and/or subsystems of the building such as electrical, mechanical, HVAC, or other subsystems. In some embodiments, a BIM may represent a plurality of physical building assets including spaces and/or equipment of a building represented by the BIM.

In some embodiments, a BIM represents building components as objects (e.g., software objects). For example, a BIM may include a plurality of objects that represent physical components within the building as well as building spaces. Each object may include a collection of attributes that define the physical geometry of the object, the type of object, and/or other properties of the object. For example, objects representing building spaces may define the size and location of the building space. Objects representing physical components may define the geometry of the physical component, the type of component (e.g., lighting fixture, air handling unit, wall, etc.), the location of the physical component, a material from which the physical component is constructed, and/or other attributes of the physical component.

In some embodiments, a BIM can be viewed and manipulated using a 2D/3D modeling program (e.g., CAD software), a model viewer, a web browser, and/or any other software capable of interpreting and rendering the information contained within the BIM. Appropriate viewing software may allow a user to view the representation of the building from any of a variety of perspectives and/or locations. For example, a user can view the BIM from a perspective within the building to see how the building would look from that location. In other words, a user can simulate the perspective of a person within the building. Accordingly, in some embodiments, model generator 550 may include a 2D or 3D modeling program, such as CAD, for generating and displaying models from BIM data.

In some embodiments, model generator 550 obtains model files (e.g., BIM files) from a model database 552. Model database 552 can store model files, as well as objects and object attribute information. For example, model database 552 can store objects and object parameters for any of the building equipment described above with respect to FIGS. 1-4. As described herein, an object may be a digital representation of a physical point within a site. For example, an object may represent a physical device, a point, or a space within a building. In some embodiments, model database 552 can also store object relationships, which describe how objects are related to one another. For example, an equipment object representing a piece of HVAC equipment may be related to a space object represent a space in a building. In this example, the equipment object could "serve" the space object (i.e., the HVAC equipment could "serve" the space).

In some embodiments, model database 552 may be or may include a graph database for storing and identifying relationships between objects. For example, the graph database may include a plurality of space references or objects, and may also indicate one or more other objects (e.g., representing building equipment) associated with each of the spaces. For example, a space object for a classroom may include a variety of HVAC, lighting, and/or IT equipment represented by objects in the graph database. Advantageously, the graph database may allow for quick identification of related objects in a building model.

In some embodiments, model database 552 is a local database, hosted by command and control tool 504. In other embodiments, model database 552 is an external database, hosted by a remote device (e.g., a remote server). It will be appreciated, however, that model database 552 can be implemented in any manner, and may even be implemented via both a local and a remote device.

Figure 6A:
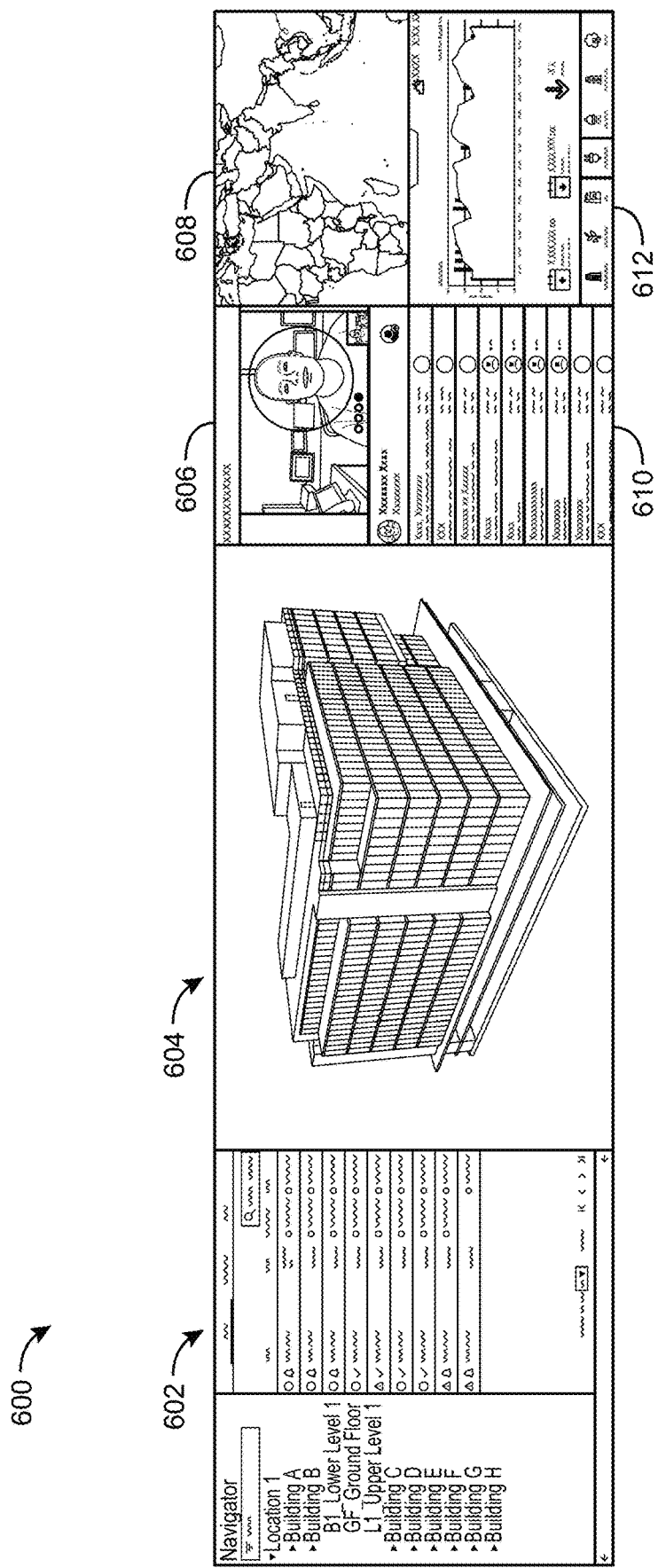
FIGS. 6A-6C are example interfaces generated and presented by the command and control tool, according to some embodiments.
Figure 6B:
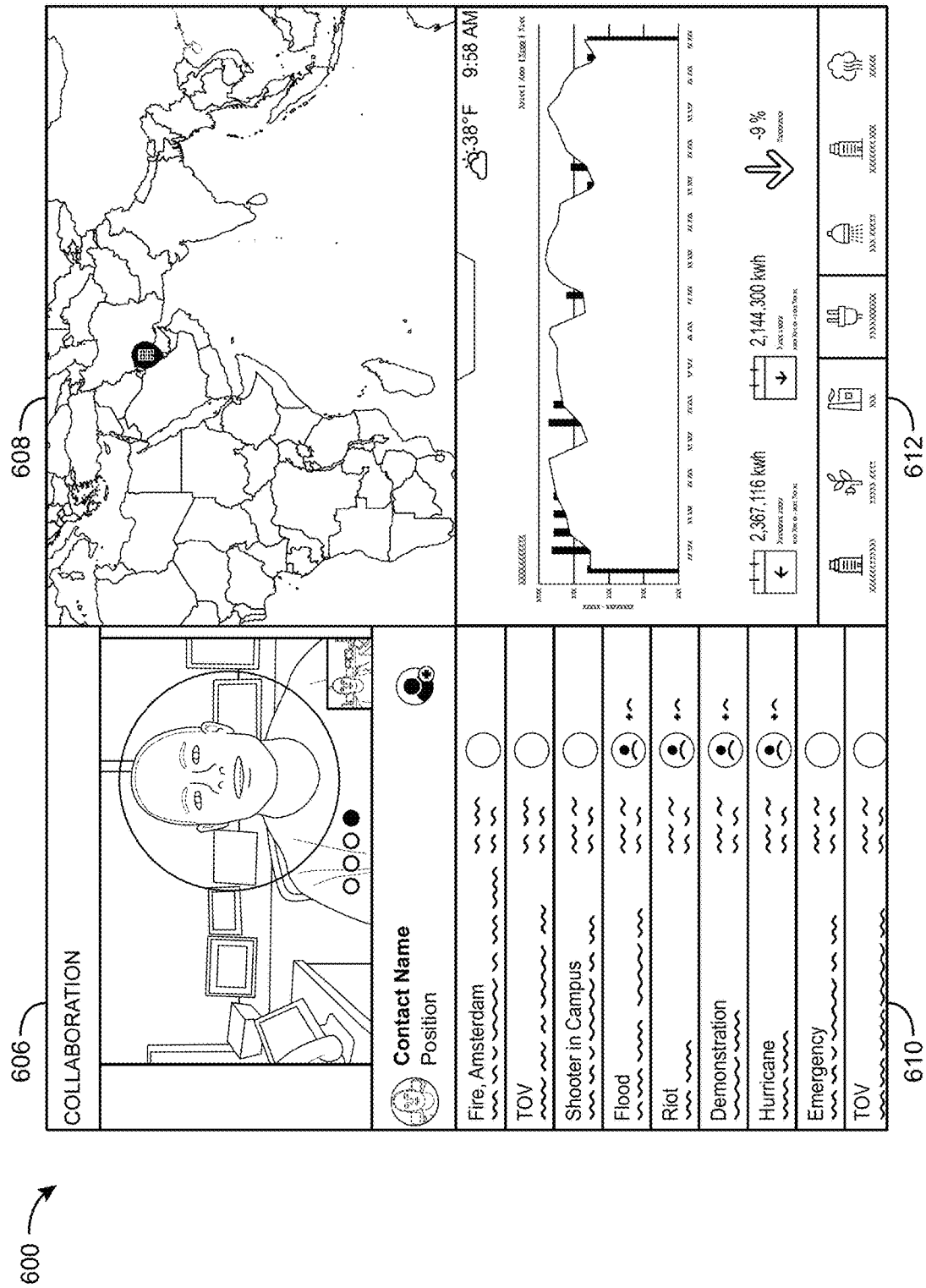
Figure 6C:
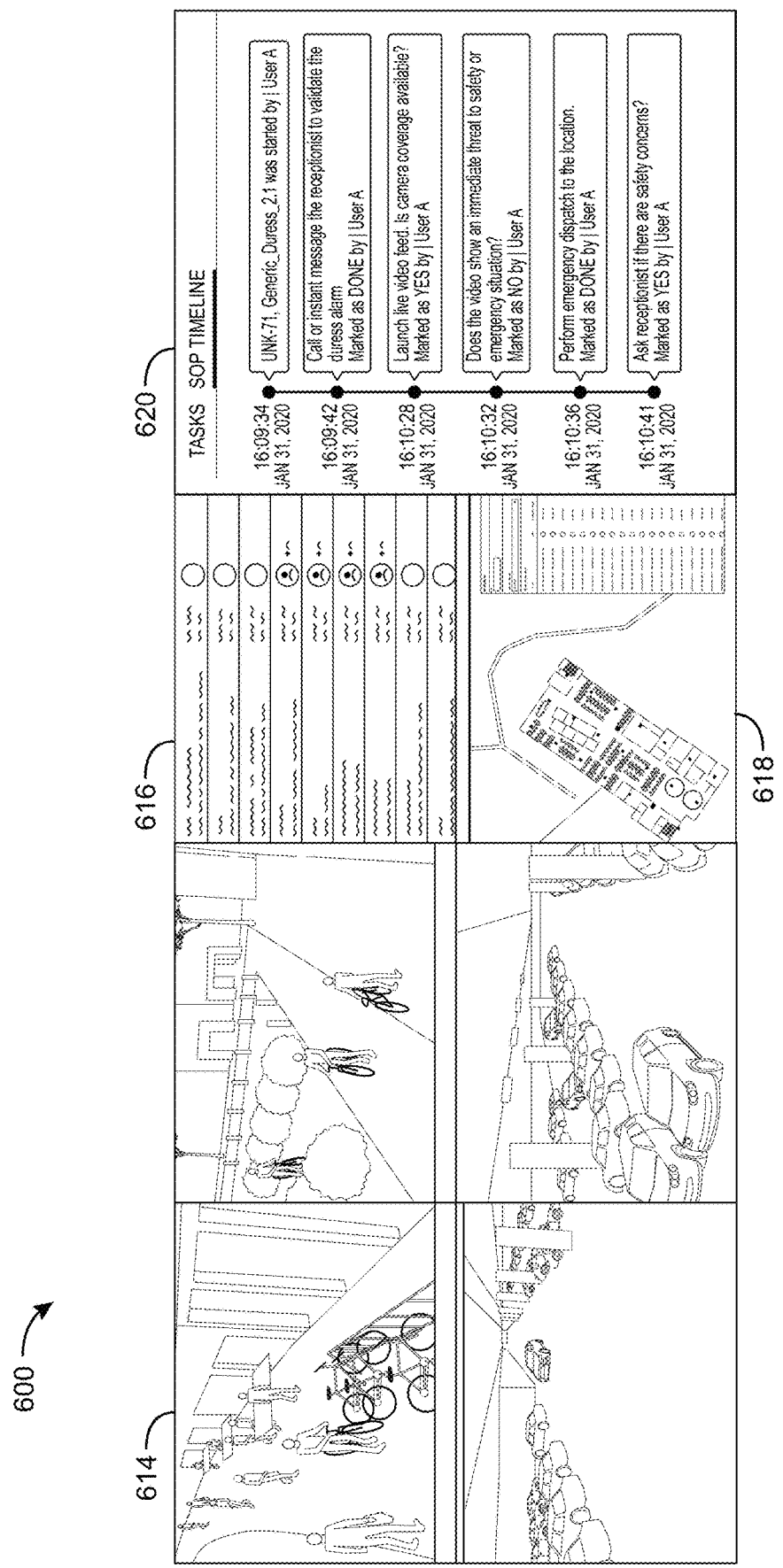

Referring now to FIGS. 6A-6C, an example of a command and control interface 600 (i.e., a "dashboard") is shown, according to some embodiments. Interface 600 may be generated by user interface generator 544, for example, and presented via user device 448 or user device(s) 501. Accordingly, a user may interact with interface 600 to view site data and/or to control site equipment. In some embodiments, interface 600 is an example of a first interface/dashboard that presents a first set of tiles in a first layout. Interface 600 may be a "default" view for a first user, for example, prior to being dynamically modified. Interface 600 is generally shown to include a plurality of "tiles" (i.e., interfaces, widgets) that present various information regarding a site. In some embodiments, the tiles shown in FIGS. 6A-6C are selected and populated according to the first layout based on a user's role.

Turning first to FIG. 6A, an overview of interface 600 is shown, according to some embodiments. Specifically, FIG. 6A illustrates an example of a full command and control dashboard that may be presented across multiple user devices (e.g., multiple screens). As shown, interface 600 provides a high-level overview of a particular site, in this example a building ("Building B"). FIG. 6A shows that interface 600 includes an events tile 602, a model tile 604 (e.g., showing 3D model of the building), and a plurality of application interface tiles. It will be appreciated that the particular layout and selection of tiles show in FIGS. 6A-6C is for exemplary purposes only and is not intended to be limiting. One of skill in the art would appreciate that any other suitable layout and selection of interfaces or "tiles" may be implemented.

As described herein, command and control tool 504 may dynamically generate interface 600 to present one or more applications or tiles that are applicable to an identified event, based on the role or preferences of a user, based on a "status" of the site or system 500, or based on another parameter. In some embodiments, at least a portion of the tiles presented in interface 600 are selected by the user. In other words, interface 600 may be customizable based on a user's preferences, and may be dynamically updated, either by the user or by command and control tool 504 (e.g., based on an event). In some embodiments, interface 600 may be updated to present a particular set of tiles based on a role of the user interacting with interface 600 or logged-in to command and control tool 504. Advantageously, changing or updating one or more tiles within interface 600 may decrease a user's response time to site events (e.g., alarms, warnings, etc.) and may increase intuitiveness by presenting the most applicable or important tiles in a single interface. In this regard, it will be appreciated that any of the tiles or interfaces described below with respect to interface 600 may be changed, replaced, or moved to fit a user's preferences or a particular scenario.

As described above, the leftmost tile of FIG. 6A is events tile 602, presenting events (e.g., alarms) for a building. In this example, events tile 602 allows a user to search events (e.g., filter by type, location, etc.) as well as select a particular event to view additional information or to create an incident, thereby initiating response procedures. Each event displayed within events tile 602 may include a type of event (e.g., fire alarm, camera disconnected), time and date associated with the event, an equipment identifier of a piece of equipment associated with the event, and a location associated with the event. Next to the events tiles is model tile 604 that allows a user to select either a 2D or 3D model (i.e., digital representation) of a building, floor, space, equipment, etc., associated with a selected site. In this case, a 3D model of "Building B" is presented. Advantageously, allowing a user to select between 2D and 3D viewing allows for quick identification of equipment and spaces that are near an event, while providing the user a complete view of the situation. In some embodiments, a user may select a particular event from events tile 602, and the model presented in model tile 604 may be automatically adjusted (e.g., zoomed-in, panned, rotated, etc.) to show a part of the model corresponding to the event (e.g., a space or device). Model tile 604 is described in greater detail below, with respect to FIGS. 7-9A.

Interface 600 also includes an exemplary variety of application interface tiles (e.g., widgets) that present a wide variety of information. As described above, any of the application interface tiles may be customized, either by a user or automatically in response to the selection of an event or based on the user's role. As shown, interface 600 includes examples of a collaboration platform tile 606, a map tile 608, a secondary event tile 610, and an asset health tile 612.

Turning now to FIG. 6B, a more detailed view of the various application interface tiles is shown. Collaboration platform tile 606 may provide a live view of a meeting between various users (e.g., members of an incident response team). In the example shown, collaboration platform tile 606 shows a video stream from a webcam of a user (i.e., a team member), allowing multiple team members to chat (e.g., while responding to an event). The collaboration platform tile 606 may further include the user's name and position within the company. Collaboration platform tile 606 may also include a chat window, audio feed, or live video feed from other cameras such as security cameras. In some embodiments, an on-ground user may be able to stream video from the scene of an event via collaboration platform tile 606. Additionally, collaboration platform tile 606 may be automatically rendered via interface 600 when a meeting is started in response to an event.

Map tile 608 provides a visual indication of the location of various events, sites, or equipment. For example, map tile 608 may indicate the location of various buildings (e.g., as shown by the building indicator in FIG. 6B) that are managed or monitored by a single user (e.g., a facilities manager, a security manager, etc.). In some embodiments, map tile 608 may provide an indication of where various events are occurring. For example, a first building located in a first county may be experiencing an equipment malfunction, while a second building in a second county may be experiencing a security breach. Accordingly, map tile 608 allows the user to quickly locate and respond to events across multiple sites. In some embodiments, map tile 608 provides an indication of where multiple buildings or sites, managed by a single user or via a single dashboard, are located.

Secondary event tile 610 may present a variety of information on various historical or current events. In one example, secondary event tile 610 may display multiple events (e.g., fire, shooter on campus, flood, riot, demonstration, and emergency) that a user is handling simultaneously. The user may select an event from secondary event tile 610 to dynamically adjust interface 600 and switch between events. Additionally, secondary event tile 610 may indicate a time associated with each event, a location associated with each event, and a list of other users (e.g., members of a team) handling the various events.

Asset health tile 612 may provide a variety of information regarding the health or status of various assets or equipment. For example, as shown, asset health tile 612 may present current electricity consumption for a building or site (e.g., the illustrated graph shows the kilowatt-hours consumed each day over the course of a month), along with a variety of other information such as $CO_2$ emissions, hot water and natural gas usage, steam production, a comparison of month-to-month electricity consumption between a present month and a preceding month, etc. Additionally, asset health tile 612 may present real-time statuses of various connected devices (e.g., equipment 516-530). For example, asset health tile 612 may presented a variety of devices, organized by type, and indicate how many of each device is experiencing an event (e.g., a warning or alarm), offline, or online.

Turning now to FIG. 6C, additional tiles are shown. First, a security tile 614 is shown that includes a plurality of feeds from security cameras associated with a site or building. A user may customize which security camera feeds are shown in security tile 614, or the feeds may change at a predetermined interval (e.g., every 30 seconds). From security tile 614, a user may monitor live video from anywhere around a site, such as to use the video feeds provided in security tile 614 to locate and view a space associated with an event.

Also shown is a response process tile 616. Response process tile 616 illustrates a time and tasks associated with the response to an event. In one example, response process tile 616 may include the tasks that are automatically initiated at the generation of an incident, as described above. In the example shown, response process tile 616 includes a time of when various task of a response process where completed. Also included is a time stamp for when the task was completed and an indication of the user that marked the task complete. In this manner, a first user that is overseeing a response to an event may monitor the response status and how quickly the various tasks are completed. Additionally, collecting timestamps for each task may benefit in auditing and reporting of event responses. In some embodiments, a secondary response process tile 620 may be presented in addition to response process tile 616. In the example shown, the secondary response process tile 620 includes a "tasks" tab and a standard operating procedure (SOP) timeline. The "tasks" tab may show various subtasks associated with an initiated SOP. As shown in the example provided in FIG. 6C, the SOP timeline includes a timeline of the various subtasks associated with the SOP including the time that the tasks were completed and an indication of the person who completed the task.

Finally, a 2D model tile 618 is shown. In some embodiments, 2D model tile 618 may be presented in addition to, or in place of, model tile 604. As shown, 2D model tile 618 provides an aerial or overhead view (i.e., a layout) of a building or site. In some embodiments, the 2D model is a floorplan of a site. A user may use 2D model tile 618 to locate an event, develop ingress or egress routes, etc. In combination with a 3D model presented in model tile 604, the user may be presented with a complete view of a particular area of a site or building (e.g., an entire floor). In some embodiments, the 2D model shown in 2D model tile 618 may be presented in model tile 604, and 2D model tile 618 may be replaced with a 3D model of the building or site.

In other embodiments, a number of other tiles may be included. A dynamic risk tile may leverage data from a dynamic risk engine (e.g., Dataminr®), which receives, correlates, and filters threat data in real time. The threat data is continuously scored using a model to generate a map or list of potential risks, such as active shooters, bomb threats, explosion, hate crimes, virus spread, etc. The overall risk for a space or equipment is calculated based on a calculated threat rating, vulnerability rating, and cost. Accordingly a user may quickly identify potential threats or issues before they occur, and may attempt to mitigate the threat.

In other example, interface 600 may include any of a news tile, a weather tile, a social media tile, a traffic tile, etc. Accordingly, interface 600 may provide a feed of social media data received from a social media site, or may present current and forecasted weather data. In one example, a social media tile may be configured to track keywords associated with a site, building, stadium, etc., to identify and respond to events (e.g., a rowdy fan, a fight, overcrowding, etc.). Likewise, a weather tile could be configured to track storms so that a building could be evacuated. It should be understood that, for various applications and use cases, a wide variety of different applications and corresponding tiles could be utilized, and all such implementations are contemplated within the scope of the present disclosure.

Figure 7:
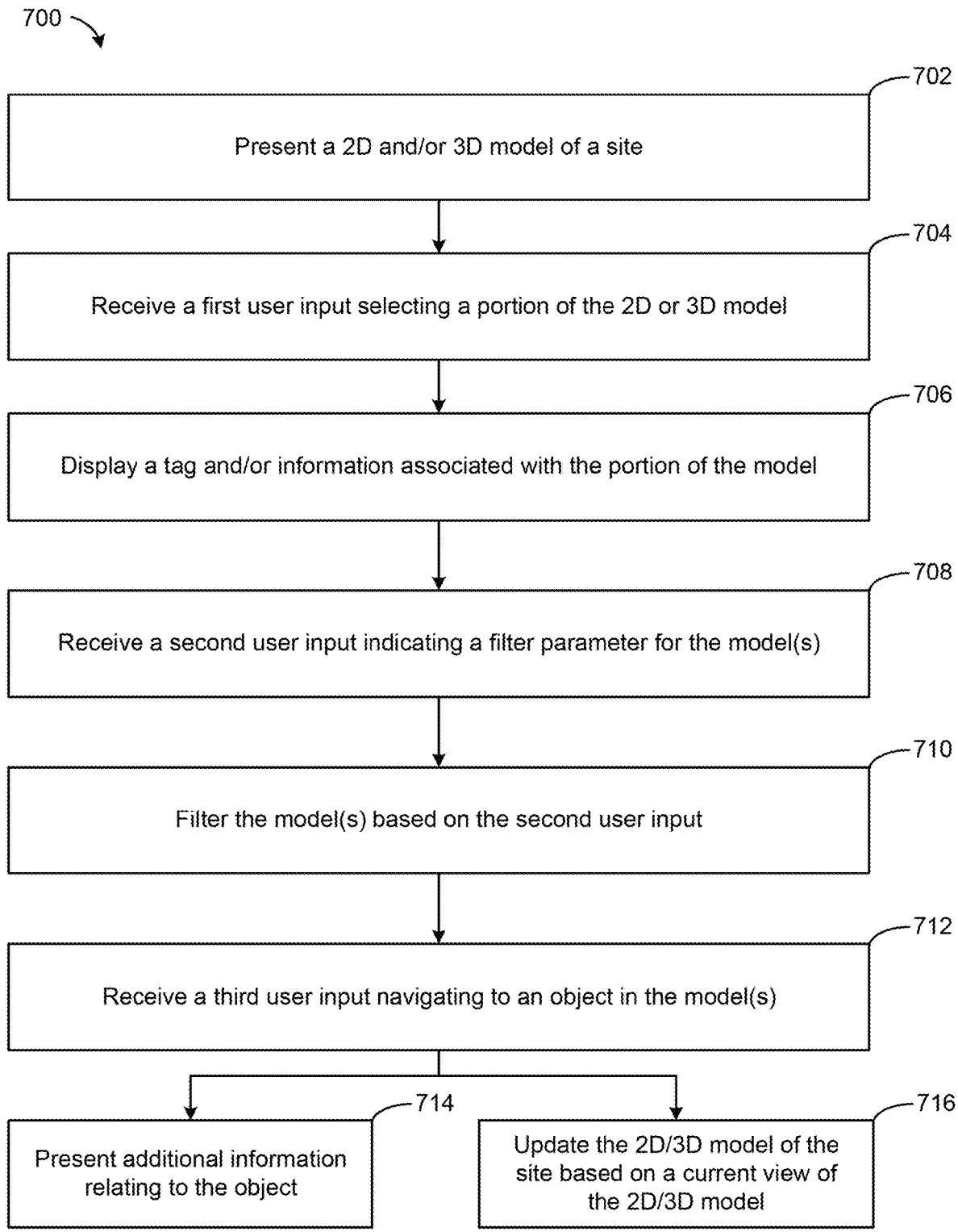
FIG. 7 is a process for implementing a building or site model in a command and control interface, according to some embodiments.

Referring now to FIG. 7, a process 700 for implementing a building or site model in a command and control interface is shown, according to some embodiments. Process 700 may be implemented by system 500, for example, and at least in part by command and control tool 504. Process 700 may advantageously produce intuitive and easy-to-navigate user interfaces that include 2D and/or 3D site models, in addition to aggregate site data. In this regard, a user may view a wide variety of information from a single interface, and may interact with various site models to navigate through a digital version of a site. In some embodiments, process 700 may require significantly less user interaction than other event response methods. It will be appreciated that certain steps of process 700 may be optional and, in some embodiments, process 700 may be implemented using less than all of the steps.

At step 702, a 2D and/or a 3D model of a site is presented via a user interface. In some embodiments, the model(s) are presented in a command and control dashboard (e.g., similar to interface 600), implemented by a user device (e.g., user devices 501). In some such embodiments, each site model may be presented in a separate tile in the command and control dashboard. In other words, a first tile may present a 3D site model while a second tile may present a 2D site model, similar to interface 600 described above with respect to FIGS. 6A-6C. Advantageously, the command and control dashboard can present a both a 2D model and a 3D model concurrently, to provide more robust navigation. Although, it will be appreciated that in some embodiments, only one of a 2D or 3D model is presented. In some embodiments, a 3D model tile may be more prominent than a 2D model tile. For example, the 3D model tile may larger in size, or may be positioned near the center or another focal point of a user interface. In other embodiments, the 2D model tile may be more prominent than the 3D model tile. It will be appreciate that all such configurations of 2D and 3D model viewing tiles are contemplated herein.

In some embodiments, each of the models may be presented with a number of navigation tools. A user may interact with the navigation tools (e.g., pan, zoom, rotate, etc.) to adjust the model shown in either tile. In some embodiments, the user may simply interact directly with a model to pan, zoom, rotate, etc. For example, the user may view the model(s) on a touch screen device and may use on or more fingers to interact with the model (e.g., pinch-to-zoom, swipe left/right to rotate, etc.). In this way, a user may navigate or "explore" the 2D and/or 3D models to view different objects (e.g., spaces, equipment, etc.). As described above, the model(s) can be generated from a BIM file, in some embodiments. Although, in other embodiments, the model(s) may be generated from any other suitable model file. An example of an interface including both a 2D site model and a 3D site model is shown in FIGS. 9A-9D, described in detail below.

At step 704, a first user input selecting a portion of the 2D or 3D model is received. In some embodiments, the user may select a portion of the model(s) using the navigation tools to navigate to a particular portion or object of the model(s). The "portion of the model" may be a particular space, device, or point, represented by an object in the model. In some embodiments, the user may select a particular area represented in the model (e.g., a room, a floor, a space, etc.) using a navigation bar or another type of menu (e.g., the navigation menu shown in FIG. 6A). In some embodiments, the user may simply hover over a portion of the model (e.g., holding a pointer over the portion of the model). In any case, the portion of the model(s) or the objects being selected by the user are identified.

At step 706, a tag or other information relating to the identified portion of the model is presented. For example, if the user hovers over a particular portion of the model, a name or an identifier of the space represented by that portion of the model (i.e., a name or identifier of a space object) may be displayed. Other information may also be presented when the user selects a portion of the model. For example, any number of parameters (e.g., stored in an object) associated with the identified portion of the model may be presented (e.g., current values for a device object, setpoints for a space object, etc.). In some embodiments, the tag or other information may be presented as a pop-up or an overlay to the user interface (e.g., when the user hovers over a space in the model, the space name may pop-up in a text box near the user's cursor). In this way, a user may quickly identify a name and/or other information for a portion (e.g., a space or device object) of the model, without having to navigate to a second interface.

At step 708, a second user input indicating a filter parameter for the model(s) is received. The filter parameter may be any sort of parameter or identifier that applies to a subset of objects within a model. In some embodiments, the filter parameter is a tag defining a type of object (e.g., an HVAC object, an electrical object, "conference room" spaces, etc.) or a particular space (e.g., a particular floor or room, a particular building, etc.). For example, the user may choose to filter the model(s) to only display objects on the second floor of a building, or to only display objects associated with a security subsystem. In some embodiments, the filter parameter may be entered via a selection from a menu (e.g., a drop down menu, by selecting one or more check boxes, etc.), via a text box, etc.

At step 710, the model(s) are filtered based on the second user input. In other words, only objects relating to the filter parameter(s) are shown within the model(s). Referring to the example above, if the user enters a particular floor as a filter parameter, any objects shown in the model relating to other floors (e.g., space or equipment objects) may be removed or hidden from the model viewer. As another example, the user may choose to display only HVAC equipment, in which case the model(s) may be filtered to only display a model of an HVAC subsystem of the building.

In some embodiments, a filter parameter is applied to only one of the 2D or 3D model. For example, the user may filter only the 3D model according to the filter parameter, while the 2D model remains unchanged. This may provide the user with additional information that may be hidden or lost if only a filtered version of the model(s), or if only one model, were presented.

At step 712, a third user input is received. The third user input may include multiple individual user inputs to one or more navigation tools of the 2D/3D model viewers, or may otherwise include a user input that adjusts the model shown in one of the 2D or 3D model viewers. For example, the user may pan, zoom, rotate, etc., a 3D model to hone in on a particular object (e.g., a space or a device) in the model. In a more detailed but non-limiting example, the user may navigate through the 3D model to view and/or identify a particular device object, representing a device within a building.

At step 714, additional information relating to an identified object is presented. Additional information may include object parameters that are associated with/stored in the object (e.g., in model database 552), and/or that are associated with a physical space or equipment associated with the object. For example, temperature setpoints may be associated with a space object representing a room, or a capacity may be associated with a device object representing a particular device (e.g., a chiller in an HVAC system). In this regard, the additional information may include stored information or information received (e.g., in real-time) from a physical space or device associated with the identified object.

In some embodiments, the additional information includes event data corresponding to the identified object. As described above, an event may be any noteworthy indication relating to any space or device of a site. For example, an event could be an alarm condition for a building device or an indication that a setpoint for a space has been exceeded. Event data is described in greater detail above. In any case, selecting a particular object in the model may present event data for physical spaces or equipment associated with that object. In some embodiments, event data for any objects shown in a current view of the 2D or 3D model viewers is presented. In some embodiments, event data for additional objects associated with a selected object (e.g., close in proximity, part of the same subsystem, etc.) can also be presented. An example of event data corresponding to a model is described in detail below, with respect to FIG. 9A.

Figure 9A:
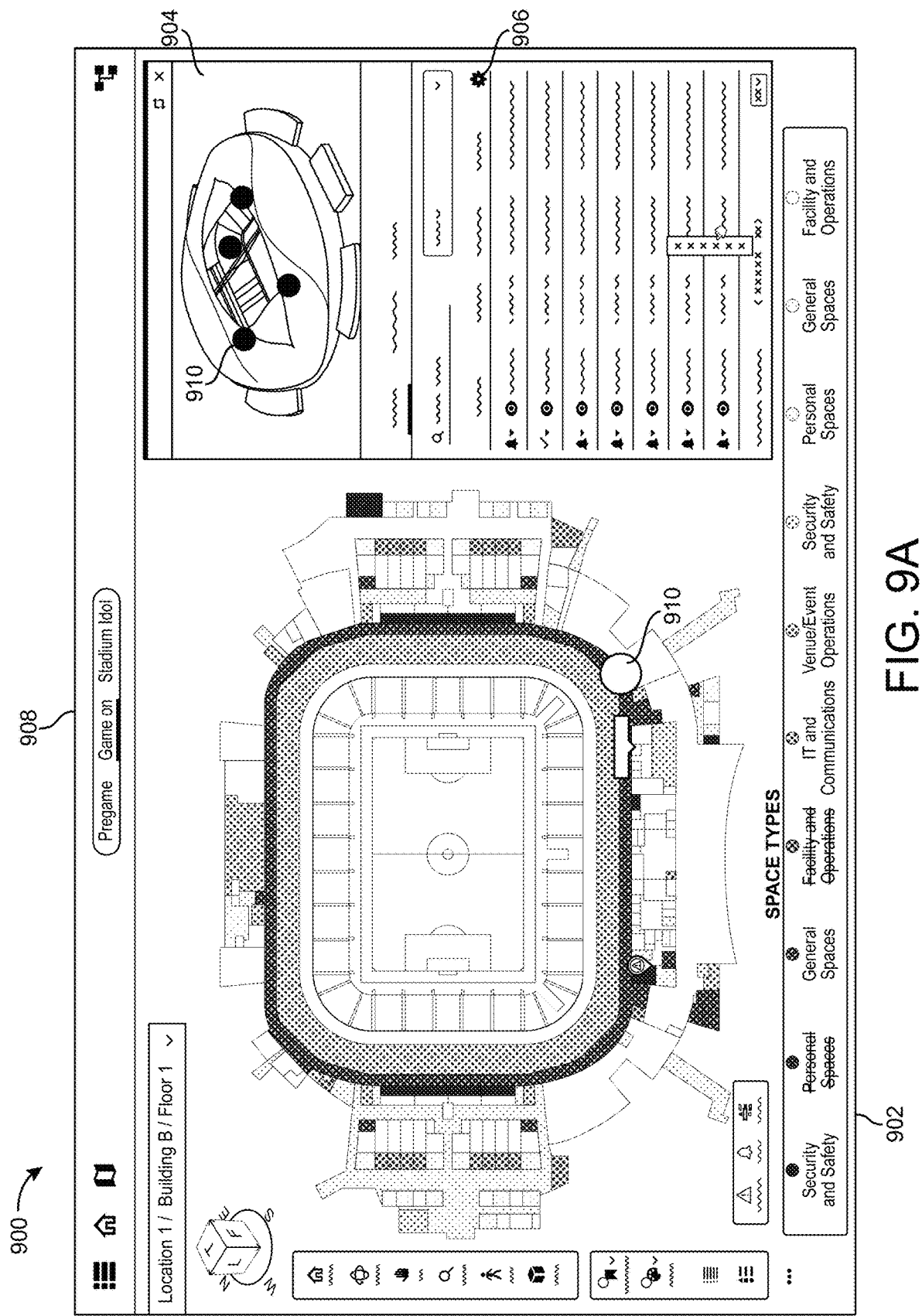
FIGS. 9A-9D are example command and control interfaces for viewing site models and creating incidents, according to some embodiments.
Figure 9B:
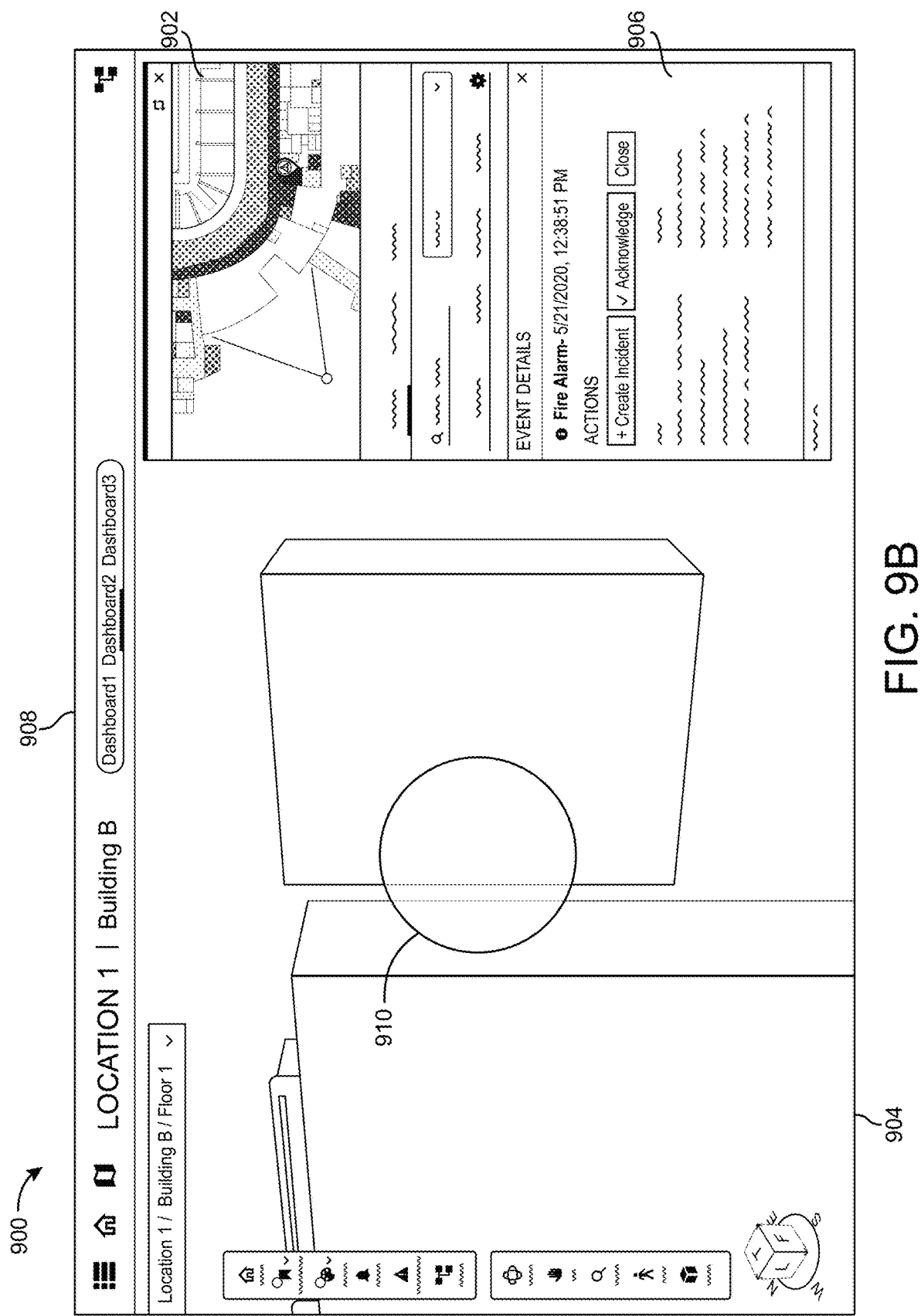

At step 716, one of the models is updated based on a current view of the other model. In other words, if the user navigates (i.e., adjusts the view) of a first model, the second model may be navigated/adjusted in kind. For example, if the user navigates to a particular device object in a 3D model, the 2D model may be updated to indicate where, in the 2D model, the particular device is located. In another example, the user may navigate to a particular room in the 2D model, and the 3D model may be updated to display corresponding 3D model objects. Updating the 2D/3D model based on the other model is shown in FIGS. 9A and 9B, described in greater detail below. It will be appreciated that, in some embodiments, step 716 occurs simultaneously with step 714. In other embodiments, one of step 714 or step 716 may occur before the other. In yet other embodiments, step 714 may be skipped completely, and process 700 may proceed directly to step 716 from step 712.

While presenting both a 2D model and a 3D model of a site in a single interface provides a number of advantages in itself (e.g., as described above), adjusting the view of one model when navigating through the other model may provide an even more immersive and robust experience for a user. Not only does this feature provide more context to a user, but presenting and updating both models simultaneously can help a user identify and locate site objects (e.g., spaces, devices) quickly, which may be advantageous when responding to events. For example, if a fire alarm event occurs, the user may be able to quickly determine where affect equipment is located, what other equipment or spaces are nearby and may be affected, etc. This information may also enhance the planning of ingress and egress routes in an emergency, for example.

Figure 8:
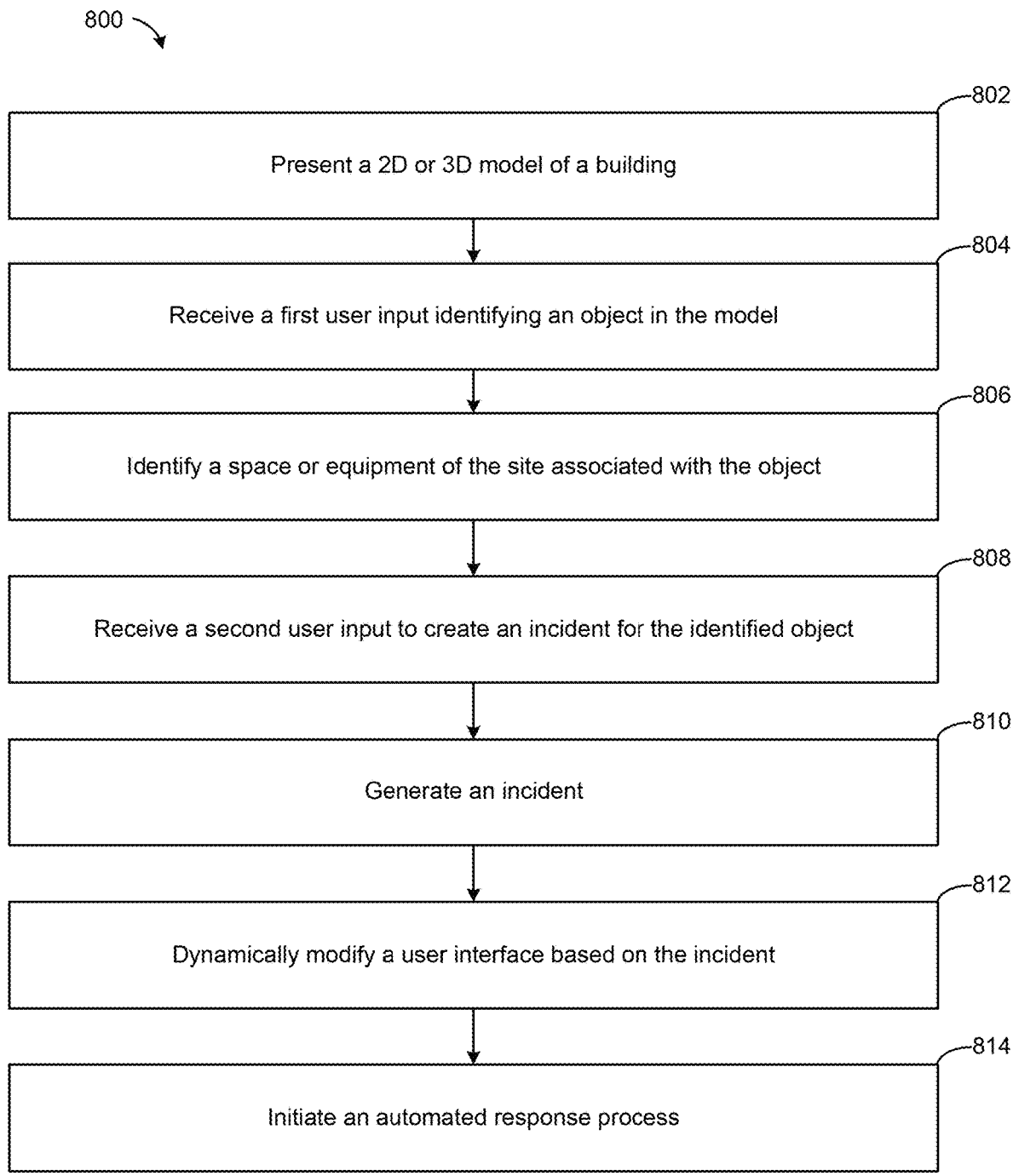
FIG. 8 is a process for generating an incident from a site model, according to some embodiments.

Referring now to FIG. 8, a process 800 for generating an incident within a site model viewer is shown, according to some embodiments. Process 800 may also be implemented by system 500, for example, and at least in part by command and control tool 504. Process 800 may allow a user to identify, and respond to, events within a system or site represented by a site model. Advantageously, identifying and responding to events using the site model may shorten response times, by allowing the user to identify necessary information more quickly. The user may also be provided with more complete and/or robust event information, to aid in the response. In some embodiments, process 800 may require significantly less user interaction than other event response methods. It will be appreciated that certain steps of process 800 may be optional and, in some embodiments, process 800 may be implemented using less than all of the steps.

At step 802, a 2D and/or a 3D site model is presented (e.g., via user device 501). In some embodiments, the model(s) are presented in a command and control dashboard (e.g., similar to interface 600), implemented by a user device (e.g., user devices 501). In some such embodiments, each site model may be presented in a separate tile in the command and control dashboard. In other words, a first tile may present a 3D site model while a second tile may present a 2D site model, similar to interface 600 described above with respect to FIGS. 6A-6C. The 2D and 3D site model may, advantageously, be presented in a single interface. In this regard, step 802 may be similar to step 702 of process 700.

At step 804, a first user input identifying an object within the model is received. As described above, the object may represent a space, equipment, or point of the site. The user may identify the object by selecting the object from a list or a menu (e.g., selecting a particular floor of a building from a navigation menu), by navigating to the object in one of the 2D or 3D model viewers, by selecting (e.g., clicking on) the object in one of the 2D or 3D models, or by any other means. In some embodiments, the first user input may include multiple individual user inputs to one or more navigation tools of the 2D/3D model viewers, or may otherwise include a user input that adjusts the model shown in one of the 2D or 3D model viewers. For example, the user may pan, zoom, rotate, etc., a 3D model to hone in on a particular object (e.g., a space or a device) in the model. In this regard, step 804 may also be similar to step 712 of process 700.

At step 806, a physical space or equipment of the site, represented by the object, is identified. In some embodiments, the physical space or equipment is identified by referencing data associated with the object. For example, model database 552 may be queried to identify physical points associated with the object (e.g., bound to the object). One or more physical points, corresponding to sensors, equipment, etc., may be associated with each object of the model(s). In some embodiments, data relating to the identified space or equipment is also obtained. For example, sensor values may be obtained for physical equipment represented by the object.

In some embodiments, the data includes at least event data corresponding to the physical spaces or equipment represented by a selected object. In such embodiments, the event data may be displayed as a pop-up or overlay once the object is selected, or may be displayed in a third tile (e.g., as shown in FIG. 9A). In some embodiments, an object in either of the models may also indicate the presence of event data. For example, an object representing a building device (e.g., a piece of fire alarm equipment) may flash or may be highlighted within the model, indicating that an event has occurred that relates to that object. In this manner, a user may quickly identify events and objects affected by said events.

At step 808, a second user input indicating the creation of an incident is received. In some embodiments, the user creates an incident from an event associated with the identified object. For example, event data associated with the object may be presented at step 806, and the user may select a particular event to create an incident. In this regard, the user may create the incident directly within one of the 2D or 3D model viewers/tiles, or may at least identify the object via the 2D/3D models prior to creating the incident. Having the option to create an incident from a 2D or 3D model may decrease user response times to events, and may reduce a burden on the user to identify necessary information prior to creating an event. The process of creating an incident via a 2D or 3D model is described in greater detail below with respect to FIGS. 9B-9D.

At step 810, in response to a user indication to create an incident, the incident is generated. In some embodiments, the incident is generated by the incident response tool 540, as described above. By generating the incident, the user indicates that a selected event warrants additional attention. For example, a fire alarm event may be verified by the user at step 808 (e.g., by checking security camera feeds for evidence of smoke or flames) and, if the user determines that the fire alarm is not a false positive, an incident may be generated. Generating the incident may also initiated one or more automated processes, as described at step 812 and 814.

At step 812, the user interface (e.g., the command and control dashboard) is dynamically modified based on the incident. For example, one or more tiles presented in the original user interface may be adjusted, removed, or replaced, and/or one or more additional tiles may be added. The layout of the tile may also be adjusted. In this manner, the user interface may be dynamically modified to enhance the response to the incident. For example, if a security breach incident is generated (at step 810), tiles providing security camera audio and video feeds or access control device statuses may be prioritized over other tiles (e.g., energy usage tiles, weather tiles, etc.). Accordingly, other, less important or relevant tiles may be minimized (i.e., made smaller in size), moved (e.g., away from the center or first page of an interface), or removed, and the most relevant or most important tiles may be added, moved (e.g., to a focal point of the interface), resized, etc.

In some embodiments, a graph database (e.g., model database 552) is also queried at step 812 to identify object relationships for dynamically modifying the user interface. Specifically, related objects (e.g., spaces and equipment) may be identified based on a generated incident, which may be useful in modifying the interface. For example, in the event of a fire alarm in a space, the graph database may be queried to quickly identify equipment within the affected space. To further this example, the graph database may indicate that the space contains multiple security cameras and may provide the ID of these cameras to one or more video viewing tiles of the interface. In this manner, video feeds from near the incident can be automatically displayed when creating or selecting an event.

At step 814, an automated response process is initiated. The automated response processes can include any number of automated steps or sub-processes that may be implemented to correct an incident. In some embodiments, the dynamic modification of the user interface at step 812 is at least a portion of the automated response process. The automated response process may also determine and initiate a digital standard operating procedure (SOP). The SOP may be presented in a tile (e.g., secondary response process tile 620) on the user interface, to provide a reference for a user when responding to the incident. The SOP may outline steps that the user or users should take to correct the incident.

In some embodiments, the automated response process also includes creating a meeting invite, adding relevant users to the meeting invite, and opening a meeting or a chat via a collaboration platform. For example, users associated with a fire response team may be added to a meeting based on the creation of a fire alarm incident. The team members may also be automatically added to a chat (e.g., text, video, call) to discuss and coordinate a response. In some embodiments, a notification (e.g., a text, a phone call, an email) may be sent to one or more users based on an incident. In some embodiments, the automated response process includes automatically scheduling maintenance or service for a device. For example, if a chiller is malfunctioning, a service ticket may be automatically generated and sent to a service technician.

Referring now to FIGS. 9A-9D, example command and control interfaces for viewing site models and generating incidents are shown, according to some embodiments. These example interfaces may be generated by command and control tool 504, as described above, for example. Each interface can include a plurality of tiles having various functionalities, depending a particular implementation. For example, the particular tiles and/or the layout of the tiles in each interface may vary based on the role or preferences of a user, a site status, a detected incident, etc. In any case, the interfaces shown in FIGS. 9A-9D are intuitive and user-friendly, allowing a user to quickly navigate each interface and, thereby, easily locate desired information.

Turning first to FIG. 9A, an example interface 900 is shown, which includes a 2D model viewer 902 and a 3D model viewer 904. 2D model viewer 902 and 3D model viewer 904 can present graphical representations of a site or building, a particular space in the site or building (e.g., a room, a floor, etc.), or a particular device. 2D model viewer 902 presents a 2D model of a site. In some embodiments, the 2D model is a floor plan of the site. As shown, for example, 2D model viewer 902 is displaying a floor plan of a stadium, also represented by the 3D model of 3D model viewer 904.

As described above, presenting both a 2D and a 3D site model in a single interface may provide a great deal more information to a user, when compared to other interfaces that present only one of a 2D or 3D model.

In some embodiments, 3D model viewer 904 is a BIM viewer that renders 3D models based on BIM files, as discussed above. In FIG. 9A, 3D model viewer 904 is shown as presenting a 3D model of a stadium. 2D model viewer 902 and/or 3D model viewer 904 can also include a number of controls to navigate through the 2D/3D model (e.g., by panning, rotating, zooming in/out, etc.). In this regard, a user may interact with 2D model viewer 902 and/or 3D model viewer 904 to view different areas or equipment represented in a model. 2D model viewer 902 and/or 3D model viewer 904 may also allow the user to select to view various triggered alarms and incidents, as well as various sub-model portions.

As described in detail above, the 2D model shown in 2D model viewer 902 may be updated as a user navigates or moves the 3D model in 3D model viewer 904, or vice versa (e.g., the 3D model may be updated as the user navigates or adjusts the 2D model). In some embodiments, 2D model viewer 902 and 3D model viewer 904 may be switched in position within interface 900, where 3D model viewer 904 is larger and placed more centrally than 2D model viewer 902. It will be appreciated that any such arrangement of interface 900 is contemplated herein.

In some embodiments, 2D model viewer 902 and/or 3D model viewer 904 may also include a number of identifiers 910. Identifiers 910 may highlight or otherwise indicate predefined portions or areas within a model. For example, the user may select a particular one of identifiers 910 to quickly navigate a corresponding preset view. Additionally, the user may select or hover over one of identifiers 910 to view additional information, such as a tag (i.e., name) or identifier associated with that portion of the model. As an example, a user may hover over one of identifiers 910 to be presented with a name for an area corresponding the identifier (e.g., "concessions", "locker room", "west end", "entrance A", etc.). The user may selected (e.g., click on) the identifier to automatically zoom in to, or otherwise navigate to, a portion of the model associated with that identifier. Additionally, the 2D model view 902 and/or the 3D model viewer 904 may allow for the user to search for different events, equipment, and spaces or locations within the 2D and/or 3D model.

Interface 900 also includes an event details tile 906. Here, a user can view event information relating to an identified or selected object. As shown, for example, the user is currently viewing a complete model of a stadium. Accordingly, event details tile 906 may present all events for the entirety of the stadium. In some embodiments, a user may navigate (e.g., using the control tools of 3D model viewer 904) to a particular device (e.g., a fire alarm panel), which may be experiencing an event. For example, as discussed above, the 3D model may indicate the presence of an event for a particular object by altering the color (e.g., flashing) of the affected device or space. The user may select an object (e.g., by navigating to the object) to populate event details tile 906 with corresponding event details, or the user may simply select an event from event details tile 906, and 3D model viewer 904 and/or 2D model viewer 902 may automatically navigate to the affected object.

From event details tile 906, a user can also view event information, such as a time and date the event was recorded, affected equipment information, a type of event, an importance of the event, a severity of the event, a location of the event, equipment involved in the event, an indication of whether the event has been acknowledged, etc. The user can then acknowledge or close the event (e.g., by selecting a button or icon), and/or can create an incident based on the event. As described above, creating an incident may initiate automated response procedures, and may cause interface 900 to dynamically update based on the incident. In other embodiments, an incident will be automatically generated.

It will be appreciated that model viewer 902, model viewer 904, and event details tile 906, as described above, and may be interchangeable (e.g., based on a particular layout of interface 900). In this regard, interface 900 also includes a site status selector 908, which allows a user to select a predefined site status or interface. As shown, for example, a user may select "pregame," "game on," or "stadium idle" to dynamically modify interface 900 based on these predetermined layouts, having a number of predetermined tiles.

Turning now to FIG. 9B, an example of interface 900 is shown after a user has navigated to a particular object within the model. In this example, the user has navigated to an object representing a fire alarm panel. In this case, the user also may have navigated to the fire alarm panel object by selecting one of identifiers 910. However, the user may also have utilized navigation tools or another method to navigate to the fire alarm panel object. Once the fire alarm panel object is selected, the user may be presented with one or more events associated with the selected object, and/or one or more event associated with other objects still shown in the model (e.g., other, nearby objects).

The user may select an event from event details tile 906 to create an incident. As shown, the user has selected a fire alarm event. Here, the user can view additional information about the fire alarm event (e.g., time and date, status, etc.), and can choose to either acknowledge the event, close the event, or create and incident.

Figure 9C:
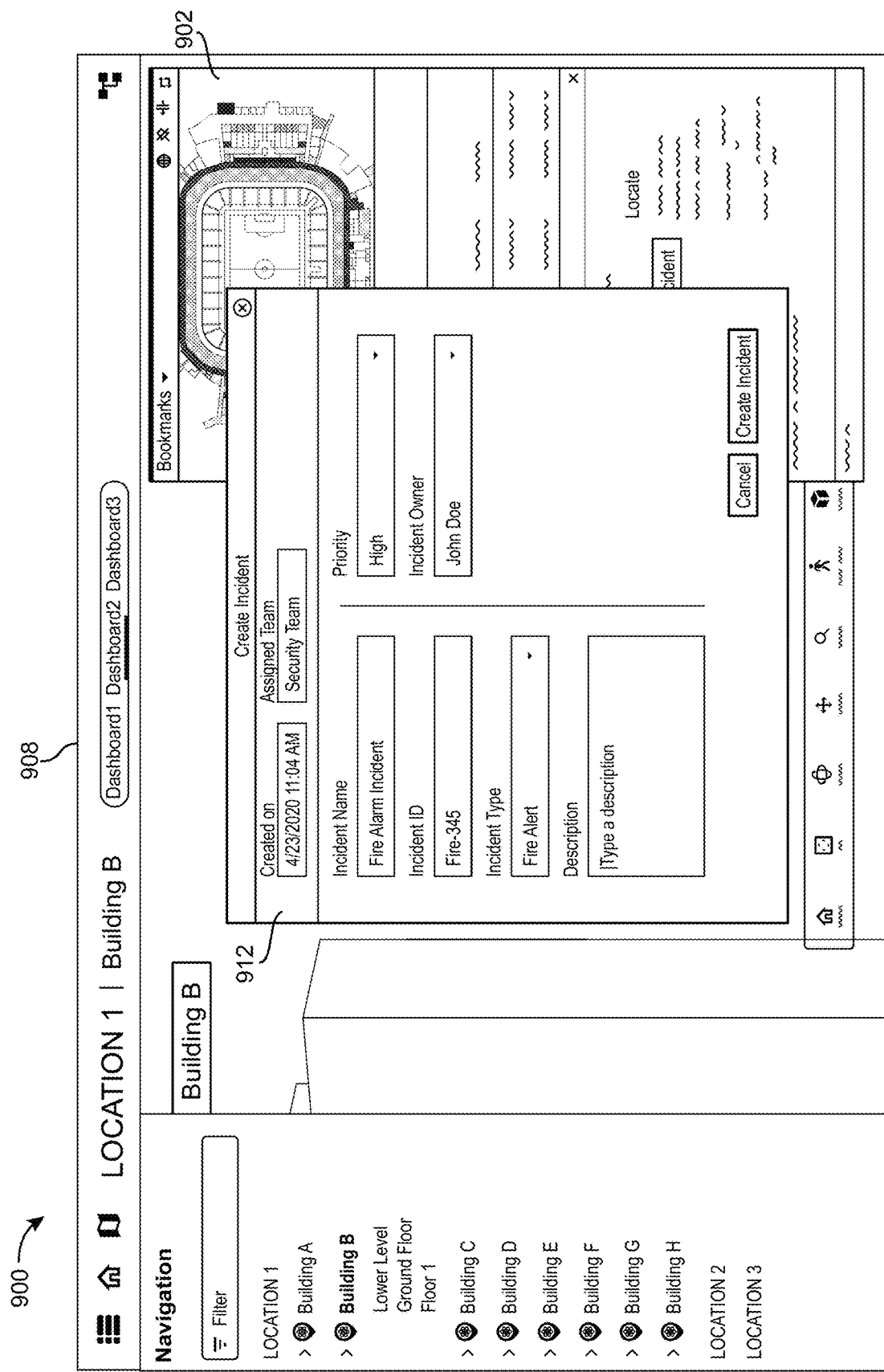
Figure 9D:
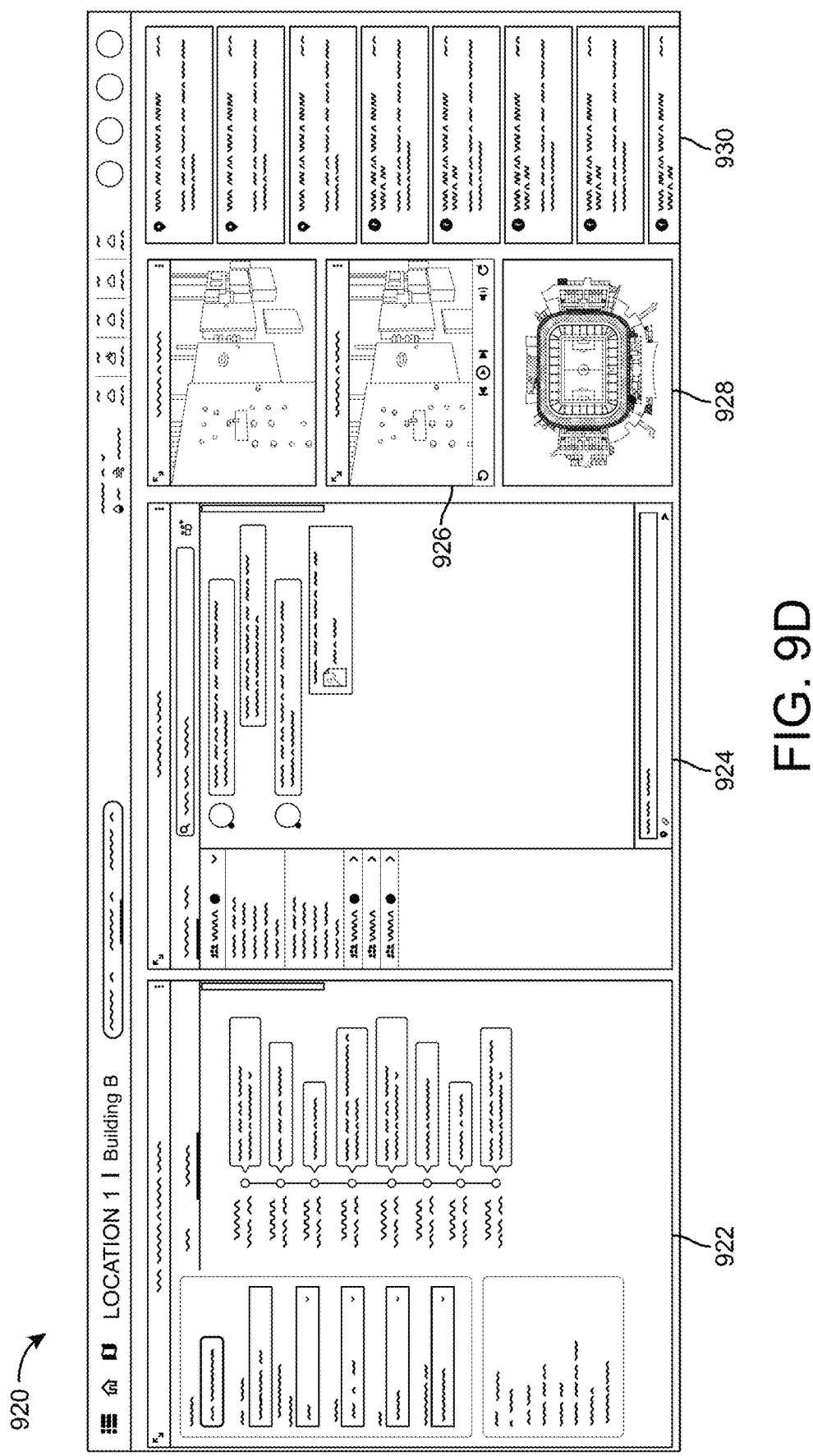

If the user chooses to create an incident, an incident creation interface 912 may be presented, as shown in FIG. 9C. In this example, incident creation interface 912 may be a pop-up or overlay, presented over interface 900. Incident creation interface 912 includes a number of fields (e.g., text boxes, menus, etc.) that a user can utilize to input information regarding the incident. For example, the user may define a type or a priority of the incident using a number of drop-down menus, and/or the user may enter a description of the incident in a text box. Certain fields within incident creation interface 912 may be automatically populated based on the event details. However, incident creation interface 912 provides a level of user control over the creation of an incident.

When an incident is created or detected, or when a user selects an incident to respond to, an incident response interface 920 (i.e., dashboard) may be generated. In some embodiments, incident response interface 920 is a modified version of interface 900, where one or more tiles are replaced, adjusted, moved, or removed. In any case, based on the incident, a user may be presented with interface 920 that includes a number of tiles applicable to the identified incident. In the example shown in FIG. 9D, interface 920 includes a response process tile 922, a collaboration tool tile 924, camera feed tiles 926, a 2D model viewer tile 928, and a social media feed tile 930. The response process tile 922 may be similar to and include similar information as the response process tile 616 and/or the secondary response process tile 620 discussed above. The collaboration tool tile 924 may be similar to the collaboration platform tile 606 discussed above and may allow for the user to navigate to a discussion regarding a given event. For example, the collaboration tool tile 924 may include a listing of events within differing zones of a building. The user may then select a particular event and have a corresponding chat window displayed showing a chat between users associated with the event. The social media feed tile 930 may include a variety of recent and/or trending posts pertaining to events associated with or taking place near the building or stadium.

As shown, certain tiles of interface 920 may be larger and/or may be presented in a layout to catch the user's attention. For example, in the event of a fire alarm, response process tile 922 and collaboration tool tile 924 may be much larger than the other tiles. This allows a user to quickly determine the steps of a response process to a fire alarm, and to collaborate with other users (e.g., security personnel, technicians) to resolve the incident. In some embodiments, as steps of an incident response are completed, interface 920 may be dynamically modified to replace certain tiles or to alter the position and size of certain tiles.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media.

Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building system comprising:
one or more memory devices having instructions stored thereon that, when executed by one or more processors, cause the one or more processors to:
generate a user interface comprising a 2-dimensional (2D) model of a building and a 3-dimensional (3D) model of the building;
receive a first user input via the user interface, the first user input indicating a selection of a first object in the 2D model or the 3D model;
determine a physical space or equipment represented by the first object;
determine one or more events associated with the physical space or equipment;
receive a second user input via the user interface, the second user input indicating creation of an incident based on the one or more events; and
initiate an automated response process in response to the creation of the incident.

2. The building system of claim 1, wherein the instructions further cause the one or more processors to:
receive a third user input associated with adjusting a view of one of the 2D model or the 3D model; and
automatically update a view of the other of the 2D model or the 3D model based on the third user input.

3. The building system of claim 1, wherein the instructions further cause the one or more processors to:
upon the creation of the incident, identify related objections within an affected space associated with the one or more events.

4. The building system of claim 1, wherein the instructions further cause the one or more processors to:
receive a third user input indicating a filter parameter for at least one of the 2D model or the 3D model; and
filter objects displayed within the at least one of the 2D model or the 3D model based on the filter parameter.

5. The building system of claim 4, wherein the at least one of the 2D model or the 3D model is only one of the 2D model or the 3D model.

6. The building system of claim 1, wherein the instructions further cause the one or more processors to:
upon receiving the first user input indicating the selection of the first object, display information pertaining to the first object via the user interface.

7. The building system of claim 6, wherein the information is presented as one of a pop-up or an overlay on the user interface.

8. The building system of claim 6, wherein the information comprises real-time information received from one of the physical space or equipment associated with the first object.

9. The building system of claim 1, wherein the instructions further cause the one or more processors to:
upon determining the one or more events associated with the physical space or equipment represented by the first object, flashing or highlighting the first object within at least one of the 2D model or the 3D model.

10. The building system of claim 1, wherein the 2D model of the building is one of an aerial view, and overhead view, or a floorplan of the building.

11. The building system of claim 1, wherein the 2D model of the building and the 3D model of the building are presented concurrently.

12. The building system of claim 1, wherein the 2D model of the user interface is a 2D model tile, the 3D model of the user interface is a 3D model tile, and the 2D model tile and the 3D model tile are different sizes.

13. A method comprising:
generating a user interface comprising a 2-dimensional (2D) model of a building and a 3-dimensional (3D) model of the building;
receiving a first user input via the user interface, the first user input indicating a selection of a first object in the 2D model or the 3D model;
determining a physical space or equipment represented by the first object;
determining one or more events associated with the physical space or equipment;
receiving a second user input via the user interface, the second user input indicating creation of an incident based on the one or more events; and
initiating an automated response process in response to the creation of the incident.

14. The method of claim 13, further comprising:
receiving a third user input associated with adjusting a view of one of the 2D model or the 3D model; and
automatically updating a view of the other of the 2D model or the 3D model based on the third user input.

15. The method of claim 13, further comprising:
upon the creation of the incident, identifying related objections within an affected space associated with the one or more events.

16. The method of claim 13, further comprising:
receiving a third user input indicating a filter parameter for at least one of the 2D model or the 3D model; and
filtering objects displayed within the at least one of the 2D model or the 3D model based on the filter parameter.

17. The method of claim 16, wherein the at least one of the 2D model or the 3D model is only one of the 2D model or the 3D model.

18. The method of claim 13, further comprising:
upon receiving the first user input indicating the selection of the first object, displaying information pertaining to the first object via the user interface.

19. The method of claim 18, wherein the information comprises real-time information received from one of the physical space or equipment associated with the first object.

20. A building system comprising:
one or more memory devices having instructions stored thereon that, when executed by one or more processors, cause the one or more processors to:
generate a user interface comprising a 2-dimensional (2D) model of a building and a 3-dimensional (3D) model of the building;

receive a first user input indicating a selection of a first object in the 2D model or the 3D model;
determine a physical space or equipment represented by the first object;
determine one or more events associated with the physical space or equipment;
receive a second user input associated with adjusting a view of one of the 2D model or the 3D model; and
automatically update a view of the other of the 2D model or the 3D model based on the second user input.

* * * * *